US006948226B2

(12) United States Patent

Chernoff et al.

(10) Patent No.: US 6,948,226 B2

(45) Date of Patent: Sep. 27, 2005

(54) CHASSIS FRAME PACKAGING CAVITY LOADING METHOD

(75) Inventors: Adrian B. Chernoff, Royal Oak, MI (US); Tommy E. White, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 100 days.

(21) Appl. No.: 10/405,982

(22) Filed: Apr. 2, 2003

(65) Prior Publication Data

US 2004/0194313 A1 Oct. 7, 2004

(51) Int. Cl.[7] ................................................ B21D 39/03

(52) U.S. Cl. ........................................................ 29/428

(58) Field of Search ................................ 29/897.2, 428, 29/469, 33 P, 785, 786, 787, 791, 822, 244; 180/216, 65.1, 68.5, 54.1

(56) References Cited

U.S. PATENT DOCUMENTS

| | | | | |
|---|---|---|---|---|
| 2,303,286 | A | 11/1942 | Lake | |
| 2,927,817 | A | 3/1960 | Raup | 296/35 |
| 3,722,948 | A | 3/1973 | Walsh et al. | |
| 4,165,794 | A | 8/1979 | Warner et al. | |
| 4,189,864 | A | 2/1980 | Saito | 46/202 |
| 4,216,839 | A | 8/1980 | Gould et al. | |
| 4,363,999 | A | 12/1982 | Preikschat | |
| 4,422,685 | A | 12/1983 | Bonfilio et al. | 296/197 |
| 4,489,977 | A | 12/1984 | Earing, Jr. | |
| 4,842,326 | A | 6/1989 | diVito | 296/196 |
| 5,058,016 | A | 10/1991 | Davidovitch | |
| 5,193,635 | A | 3/1993 | Mizuno et al. | 180/65.3 |
| 5,352,011 | A | 10/1994 | Kihara et al. | |
| 5,366,281 | A | 11/1994 | Littlejohn | 303/3 |
| 5,409,283 | A | 4/1995 | Ban | |
| 5,418,437 | A | 5/1995 | Couture et al. | |
| 5,534,848 | A | 7/1996 | Steele et al. | 340/517 |
| 5,641,031 | A | 6/1997 | Riemer et al. | 180/65.3 |
| 5,725,350 | A | 3/1998 | Christenson | 414/491 |
| 5,813,487 | A | 9/1998 | Lee et al. | 180/65.1 |
| 5,823,636 | A | 10/1998 | Parker et al. | 303/3 |
| 5,974,847 | A | 11/1999 | Saunders et al. | 72/57 |
| 6,059,058 | A | 5/2000 | Dower | 180/65.3 |
| 6,097,286 | A | 8/2000 | Discenzo | |
| 6,102,151 | A | 8/2000 | Shimizu et al. | |

(Continued)

FOREIGN PATENT DOCUMENTS

| | | |
|---|---|---|
| EP | 0274993 | 11/1987 |
| FR | 09407973 | * 12/1995 |
| GB | 2060514 | 5/1981 |
| GB | 2 178 701 A | 2/1987 |
| GB | 2 207 096 A | 1/1989 |

OTHER PUBLICATIONS

Stuart Birch, "Stick or Non–Stick," Automotive Engineering International On Line, Mar. 2000.

Sanket Amberkar, et al., "A System–Safety Process for by–Wire Automotive (continued below) Systems", SAE Technical Paper, 2000–01–1056, SAE World Congress, Detroit, MI, Mar. 2000.

Edmunds.com Editors, "Why Drive–by–Wire?", The New York Times, Nov. 29, 2000.

*Primary Examiner*—John C. Hong

(74) *Attorney, Agent, or Firm*—Kathryn A. Marra

(57) ABSTRACT

A method of assembling a vehicle chassis includes providing a vehicle frame having a plurality of packaging cavities opening in a plurality of different directions, mounting vehicle hardware components toward openings in the packaging cavities and installing the vehicle hardware components into operative positions in their packaging cavities. The installation of the vehicle hardware components and their respective packaging cavities may be arranged to make the components removable from the frame in respective ones of the different directions.

34 Claims, 17 Drawing Sheets

U.S. PATENT DOCUMENTS 6,109,424 A 8/2000 Doan ...................... 198/468.8
6,176,341 B1 1/2001 Ansari ........................ 180/402
6,195,999 B1 3/2001 Arnold et al. ................ 60/649
6,208,923 B1 3/2001 Hommel ...................... 701/42
6,219,604 B1 4/2001 Dilger et al. ................. 701/41
6,223,843 B1 5/2001 O'Connell et al. ........ 180/65.3
6,253,588 B1 7/2001 Rashid et al. .................. 72/57
6,305,758 B1 10/2001 Hageman et al. ........ 303/115.2
6,318,494 B1 11/2001 Pattok ........................ 180/402
6,321,145 B1 11/2001 Rajashekara ................. 701/22
6,370,460 B1 4/2002 Kaufmann et al. ........... 701/41
6,378,637 B1 4/2002 Ono et al. ................. 180/65.3
6,390,565 B2 5/2002 Riddiford et al. .............. 303/3
6,394,207 B1 5/2002 Skala ........................ 180/65.2
6,394,218 B1 5/2002 Heitzer ....................... 180/402
6,394,537 B1 5/2002 DeRees
6,397,134 B1 5/2002 Shal et al. .................... 701/37
6,408,966 B1 6/2002 Benz et al.
6,424,900 B2 7/2002 Murray et al.
6,435,584 B1 8/2002 Bonnville
6,488,345 B1 12/2002 Woody et al.
2001/0029408 A1 10/2001 Murray et al.

* cited by examiner

CHASSIS FRAME PACKAGING CAVITY LOADING METHOD

TECHNICAL FIELD

The invention relates to assembly of vehicle chassis.

BACKGROUND OF THE INVENTION

Assembly of vehicle chassis typically requires connecting vehicle hardware components, such as steering system components, braking system components and energy conversion system components to a vehicle chassis structural frame. The components may be used in complex systems requiring the interconnection of multiple components as well as the intraconnection to other systems and components. The assembly process is typically governed by the size, shape and placement of the components with respect to the frame and with respect to the other interconnecting components. Packaging of vehicle hardware components that does not allow for exposure of the components at openings in the frame may result in inefficiencies in the assembly process. Furthermore, the ease and efficiency of performing maintenance to and repair of the vehicle hardware components is highly dependent upon the accessibility of the components.

SUMMARY OF THE INVENTION

The invention includes a method of assembling a vehicle chassis. The method includes providing a vehicle chassis structural frame defining a plurality of packaging cavities having openings facing in different directions. The method further includes providing vehicle hardware components. The method may further include mounting the vehicle hardware components toward respective openings in the respective packaging cavities from the different directions.

The method may further include installing at least some of the vehicle hardware components into operative positions in their respective packaging cavities. The installation of the vehicle hardware components and their respective packaging cavities may be arranged to make the components removable from the frame in the different directions within the scope of the invention.

In one aspect of the invention, the vehicle hardware components include braking system components, steering system components and energy conversion system components. Preferably, the vehicle hardware components form a braking system, a steering system and an energy conversion system, each of which is responsive to nonmechanical control signals.

In one aspect of the invention, the method includes positioning the frame in a first position, installing at least one of the vehicle hardware components into operative position in its respective packaging cavity when the frame is in the first position, rotating the frame to a second position and installing another vehicle hardware component into operative position in its respective packaging cavity when the frame is in the second position.

In one aspect of the invention, the method includes positioning the frame relative to the vehicle hardware components prior to mounting the vehicle hardware components toward respective openings in the respective packaging cavities. Positioning the frame may be accomplished by automated means, including a conveyor system and an hydraulic lift.

In another aspect of the invention, the method includes positioning the vehicle hardware components relative to the frame prior to mounting the vehicle hardware components toward respective openings in the respective packaging cavities. Positioning the vehicle hardware components may be accomplished by automated means including a conveyor system and an hydraulic lift.

The method may further include operatively connecting a vehicle floor to the frame to form a frame assembly having the vehicle floor overlaying at least some of the packaging cavities opening in at least one of the different directions. The method may further include operatively connecting a vehicle body to the frame assembly at the vehicle floor to at least partially define a passenger compartment.

In another aspect of the invention, the method includes providing at least one bottom panel and operatively connecting the bottom panel to the frame assembly from one of the different directions to at least partially close at least some of the packaging cavities.

In another aspect of the invention, at least some of the vehicle hardware components are provided as a hardware module which is preassembled before mounting it toward the vehicle frame.

In another aspect of the invention, the method further includes providing vehicle body components including interior hardware, vehicle body frame structure and at least one vehicle body panel. The method may further include operatively connecting the vehicle body components to the frame assembly at the vehicle floor. In one aspect of the invention, at least some of the vehicle body components are provided as a body module which is preassembled before operatively connecting it to the frame assembly.

The invention may also include a method of assembling a vehicle having a body and a chassis. The method may include providing structural elements formed into a frame having opposed faces. Providing structural elements may include forming the opposed face of the frame as a floor for the body. The method may also include mounting vehicle hardware components toward one of the frame faces from one direction to form a chassis, wherein the vehicle hardware components form at least two of a braking system that is responsive to nonmechanical control signals, a steering system that is responsive to nonmechanical control signals and an energy conversion system that is responsive to nonmechanical control signals. The method may further include mounting vehicle body components toward the opposed frame face from another direction to form a vehicle. In one aspect of the invention, mounting hardware components and mounting body components is done at substantially the same time.

The invention may also include a method of assembling vehicle chassis including providing a first vehicle chassis frame having opposed faces and a first selection of vehicle hardware components, wherein the vehicle hardware components form at least two of a braking system that is responsive to nonmechanical control signals, a steering system that is responsive to nonmechanical control signals and an energy conversion system that is responsive to nonmechanical control signals. The method may further include mounting the first selection of vehicle hardware components toward one face of the first frame from one direction. The method may further include providing a second vehicle frame substantially identical to the first vehicle frame and providing a second selection of vehicle hardware components, wherein the vehicle hardware components form at least two of a braking system that is responsive to nonmechanical control signals, a steering system that is responsive to nonmechanical control signals and an energy conversion system that is responsive to nonmechanical control signals. Mounting the second selection of vehicle hardware components toward the corresponding one face of the second frame from the same one direction may be included in the method. In this method, the configuration of at least one of the components of the first selection of vehicle hardware components is sufficiently different than the configuration of at least one of the components in the second selection of vehicle hardware components such that the first selection is different than the second selection. The differently configured component of the first selection may perform a different function or may define a different vehicle type than the component of the second selection.

The method may further include providing a first selection of vehicle body components and a second selection of vehicle body components, each selection including interior hardware, a vehicle body frame and a vehicle body panel. The method may include operatively connecting the first selection of vehicle body components into the opposed face of the first vehicle frame from another direction to form a vehicle. The method may further include operatively connecting the second selection of vehicle body components into the corresponding opposed face of the second vehicle frame from the same other direction to form a vehicle. The configuration of at least one of the components of the first selection of vehicle body components is sufficiently different than the configuration of at least one of the components in the second selection of vehicle body components such that the first vehicle is configured differently than the second vehicle. The configuration of the first selection of vehicle body components may define a different body style than the configuration of the second selection of vehicle body components or the first selection may contain components of a different material than the components of the second selection.

The above objects, features, and advantages, and other objects, features, and advantages, of the present invention are readily apparent from the following detailed description of the best modes for carrying out the invention when taken in connection with the accompanying drawings.

DESCRIPTION OF THE PREFERRED EMBODIMENTS

Figure 1:
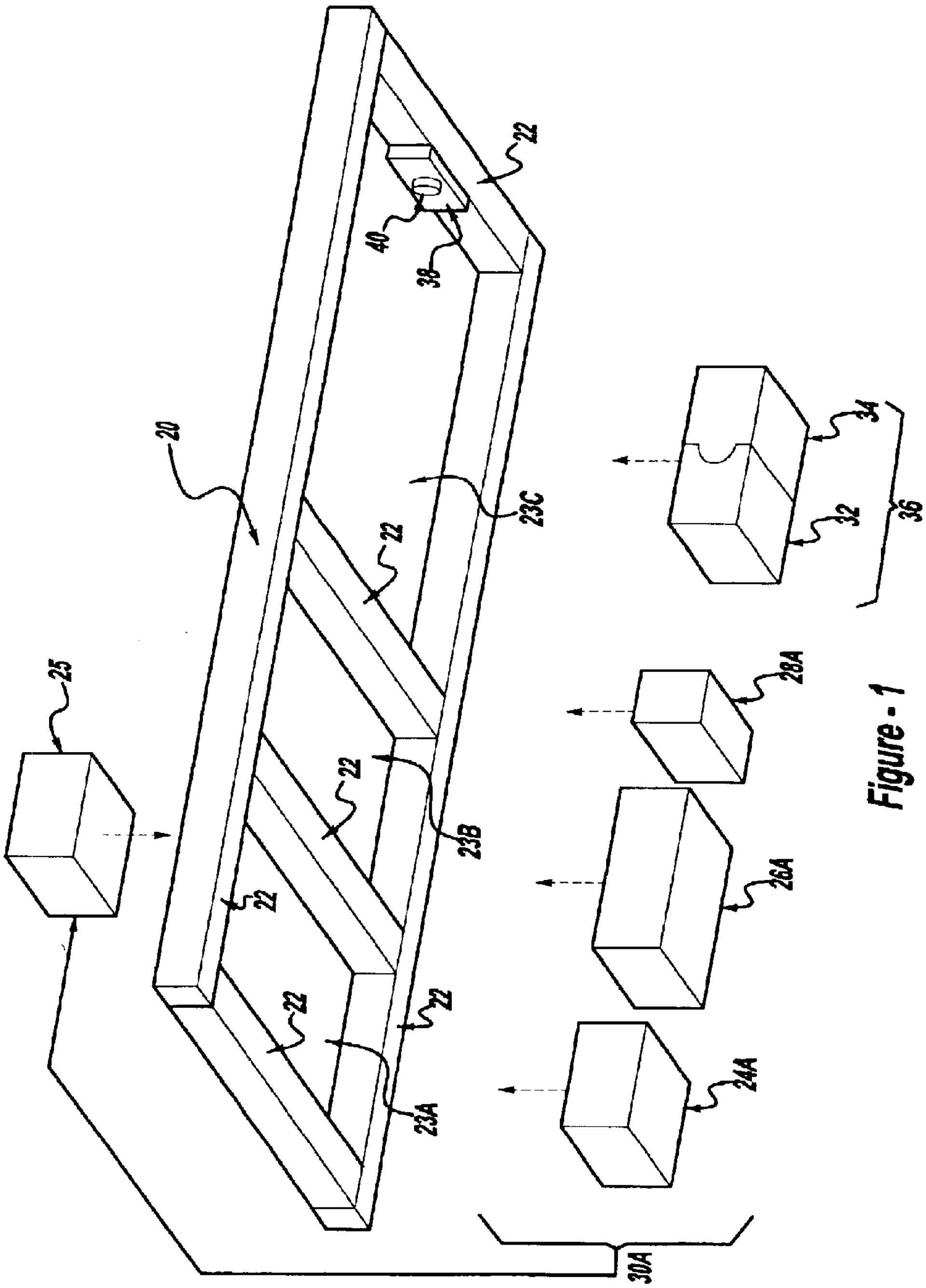
FIG. 1 is a schematic illustration in perspective view of a vehicle chassis frame and vehicle hardware components for use in a method of assembling a vehicle chassis in accordance with the invention.

Referring to FIG. 1, a frame 20A having a lower face 22 is provided. The frame is formed with packaging cavities 23A, 23B and 23C. The cavities may also be referred to as spaces. The packaging cavities 23A, 23B and 23C have openings facing the lower face 22 of the frame 20A. Openings face a direction normal to a plane through the face of the openings. In FIG. 1, packaging cavities 23A, 23B and 23C have openings facing a direction normal to a plane through the lower face 22 of the frame 22A. In this configuration, packaging cavities 23A, 23B and 23C have openings facing the opposite direction. Vehicle hardware components 30A are provided including mechanical components 24A and 25, electrical components 26A, interconnecting components 28A and a hardware module 36. Interconnecting components 28A include components that connect other vehicle hardware components, such as ductwork and electrical wiring. Mechanical components 24A, 25, electrical components 26A and interconnecting components 28A may each include only one component. The hardware module 36 is comprised of preassembled hardware components 32, 34.

Phantom arrows depicted in FIG. 1 depict mounting mechanical components 24A, interconnecting components 26A, electrical components 28A and hardware module 36 toward the packaging cavities 23A, 23B and 23C. The mechanical components 24A are mounted toward an opening in packaging cavity 23A. The electrical components 26A and the interconnecting components 28A are mounted toward an opening in packaging cavity 23B. This illustrates that more than one vehicle hardware component may be mounted toward the same packaging cavity within the scope of the invention. Hardware module 36 is mounted toward packaging cavity 23C. In this configuration, the vehicle hardware components 24A, 26A, 28A and 36 are mounted toward the respective packaging cavities 23A, 23B and 23C from a direction below the cavities. Mechanical component 25 is mounted toward an opening in packaging cavity 23A from an opposite direction, above packaging cavity 23A, which also opens toward that direction.

A hardware component 38 is shown installed in an operable position in packaging cavity 23C. A hardware component need not be completely within a packaging cavity to be considered installed in the cavity (i.e., a portion of the hardware component may extend outside of the cavity). The hardware component 38 would have been mounted toward the packaging cavity 23C from a direction below the lower face 22 of the frame 20A prior to installation. The hardware component 38 is shown operatively connected to the frame 20A by means of a bolt 40. The hardware component 38 is removable from the frame 20A from a direction below the lower face 22 of the frame 20A. This removability is depicted by the bolt 40. Other means of operatively connecting and of removing hardware components are contemplated by the invention. Thus, in accordance with an aspect of the invention, the installation of hardware component 38 and packaging cavity 23C are arranged to make the hardware component 38 removable from the frame 20A in the same direction from which it was mounted toward packaging cavity 23C. This aspect of the invention should allow for easier access to the vehicle hardware components, permitting quicker maintenance of and repair to the vehicle hardware components.

Figures 2A, 2B, 2C, 2D, 2E, 2F:
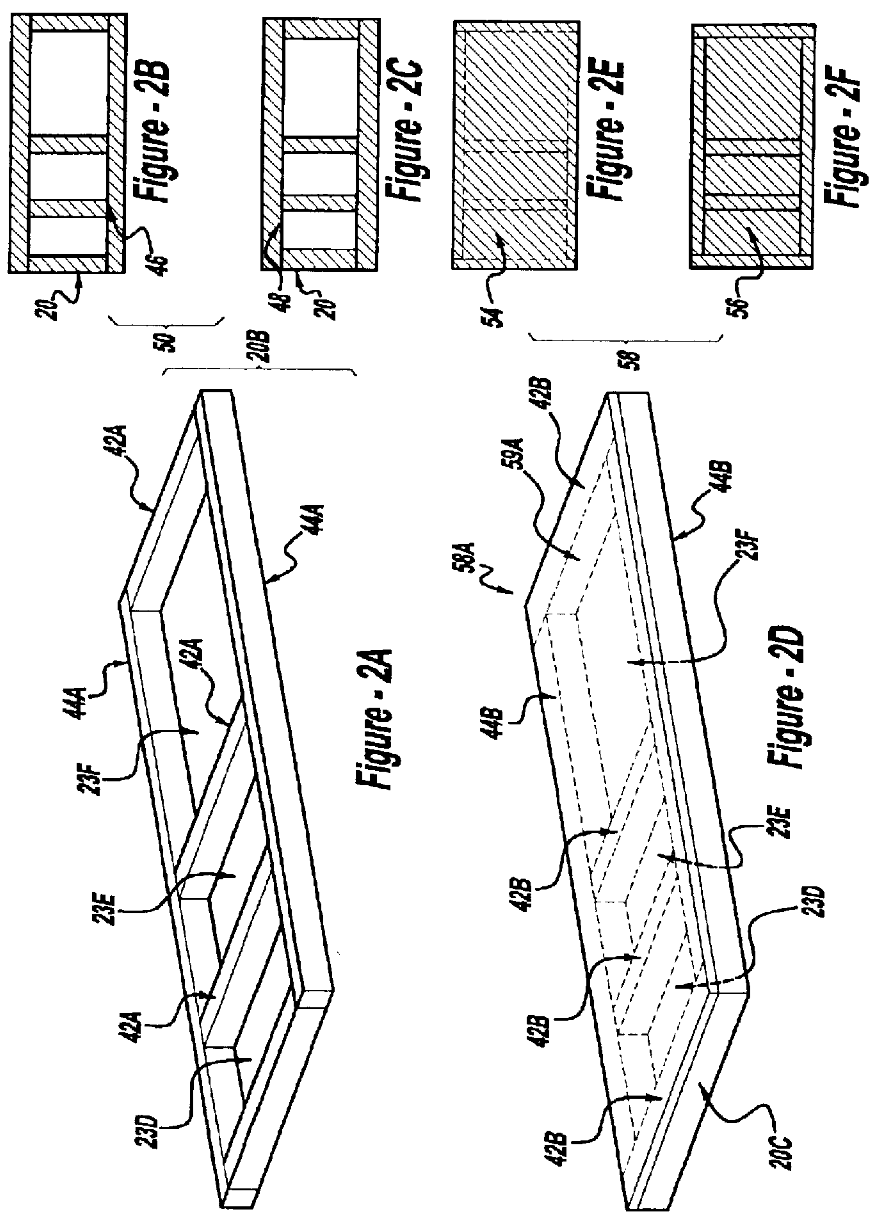
FIG. 2A is a schematic illustration in perspective view of a vehicle chassis frame for use in a method of assembling a vehicle chassis in accordance with the invention.
FIGS. 2B and 2C are schematic illustrations in plan view and bottom view, respectively, of the vehicle chassis frame of FIG. 2A.
FIG. 2D is a schematic illustration in perspective view of a vehicle chassis frame with a floor attached.
FIGS. 2E and 2F are schematic illustrations in plan view and bottom view, respectively, of the vehicle chassis frame of FIG. 2D.

Referring to FIG. 2A, wherein like reference numbers refer to like components in FIG. 1, a frame 20B is depicted, comprised of structural elements including transverse structural elements 42A and a longitudinal structural elements 44A. The transverse structural elements 42A and longitudinal structural elements 44A define packaging cavities 23D, 23E and 23F. FIG. 2B is a top view of the frame 20B showing the area of an upper face 46. FIG. 2C is a bottom view of the frame 20B showing an area comprising a lower face 48. The upper face 46 and the lower face 48 are opposed faces 50.

Referring to FIG. 2D, wherein like reference numbers refer to like components in FIGS. 1–2C, a frame assembly 58A is depicted. The frame assembly 58A includes a vehicle floor 59A operatively connected to a frame 20C. The vehicle floor 59A forms on upper face 54 of the frame assembly 58A. The frame 20C is formed from transverse structural elements 42B and longitudinal structural elements 44B. FIG. 2E is a top view of the frame 20C showing an upper face 54. FIG. 2F is a bottom view of the frame 20C showing a lower face 56. The upper face 54 and the lower face 56 are opposed faces of the frame 20C. The upper face 54 is formed as vehicle floor 59A. The vehicle floor 59A overlaps the packaging cavities 23D, 23E and 23F such that the cavities do not open toward the upper face 54 of the frame 20C.

Figure 3:
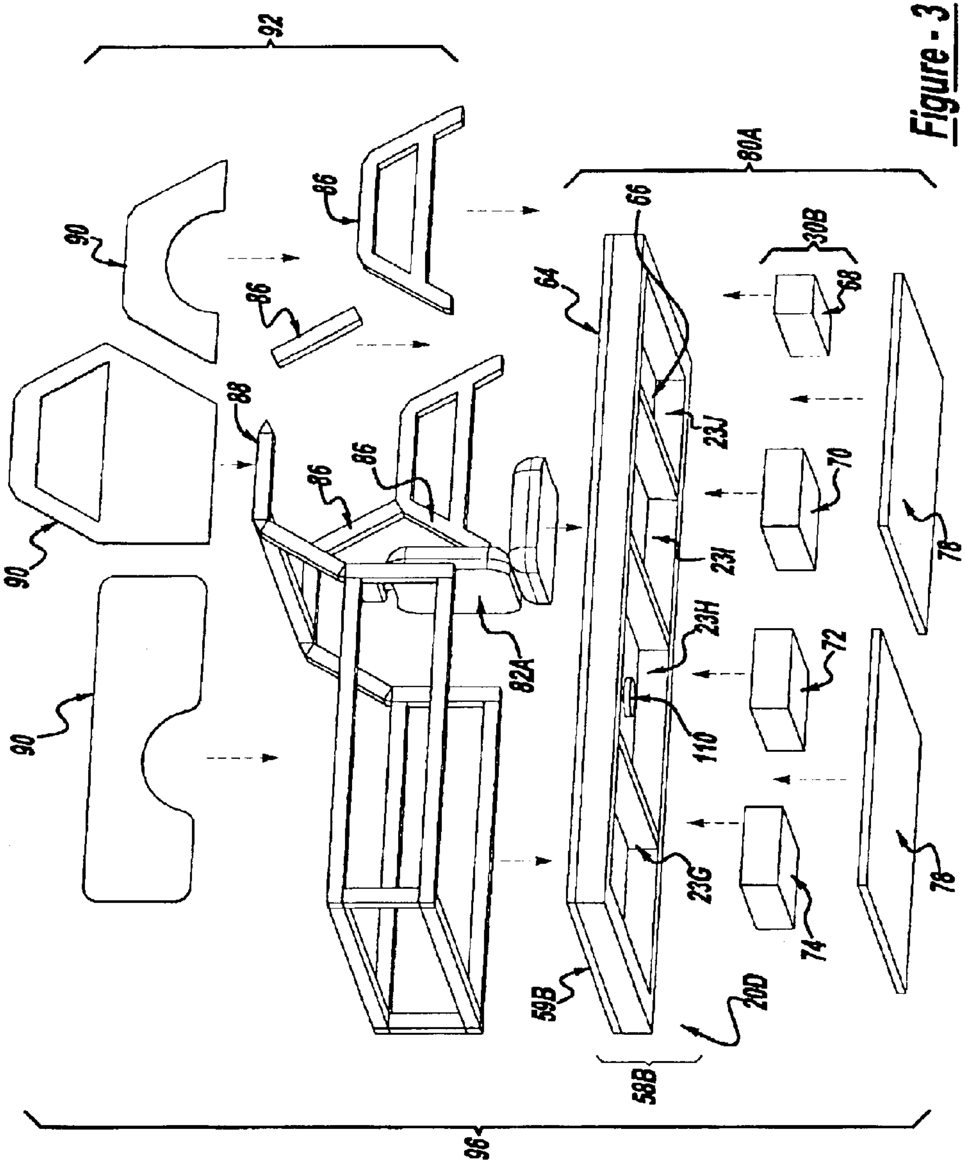
FIG. 3 is a schematic illustration in perspective view of a vehicle chassis frame, vehicle body parts and vehicle hardware for use in a method of assembling vehicles in accordance with the invention.

Referring to FIG. 3, wherein like reference numbers refer to like components in FIGS. 1–2F, a frame 20D with a vehicle floor 59B operatively connected to the frame 20D is depicted. The frame 20D and vehicle floor 59B form a frame assembly 58B. The frame assembly 58B has an upper face 64 and a lower face 66. The upper face 64 and the lower face 66 are also the upper and lower faces of the frame 20D, respectively. The frame assembly 58B is formed with packaging cavities 23G, 23H, 23I, and 23J. Vehicle hardware components 30B are depicted including a steering system component 68, a suspension system component 70, a braking system component 72, and an energy conversion system component 74. Bottom panels 78 are also depicted. The phantom motion arrows shown above the vehicle hardware components 30B depict mounting such toward the frame assembly 58B from a direction below the lower face 66. The frame assembly 58B and the vehicle hardware components 30B when operatively connected form a chassis 80A. The bottom panels 78 are operably connectable to the frame 20D and, when operatively connected, at least partially close some of the packaging cavities 23G, 23H, 23I and 23J.

Vehicle body frame structure 86 is depicted, a portion of which is provided as a preassembled body module 88. Interior hardware 82A is depicted. In FIG. 3, the interior hardware 82A is a seat. Interior hardware may also include interior lighting, interior mirrors, and other components typically located in vehicle passenger compartments. Vehicle body panels 90. The vehicle body panels 90, the body frame structure 86 including body module 88 and the interior hardware 82A are together referred to as vehicle body components 92. Phantom arrows shown adjacent to the vehicle body components 92 depict operatively connecting such components to the floor 59B of the frame assembly 58B. Operatively connecting the vehicle body components 92 to the floor 59B includes mounting the vehicle body components 92 toward the upper face 64 of the frame assembly 58B. The chassis 80A and the vehicle body components 92 together form a vehicle 96. Mounting vehicle body components 92 toward the upper face 64 of the frame assembly 58B and mounting vehicle hardware components 30B toward the lower face 66 of the frame assembly 58B may be done at substantially the same time within the scope of the invention.

The energy conversion system component 74 may be a fuel cell within the scope of the invention. The fuel cell may be a hydrogen fuel cell, a methanol fuel cell, or another type of fuel cell suitable for use on a vehicle, and may be used in part of a hybrid fuel system utilizing two different types of energy.

Figure 4:
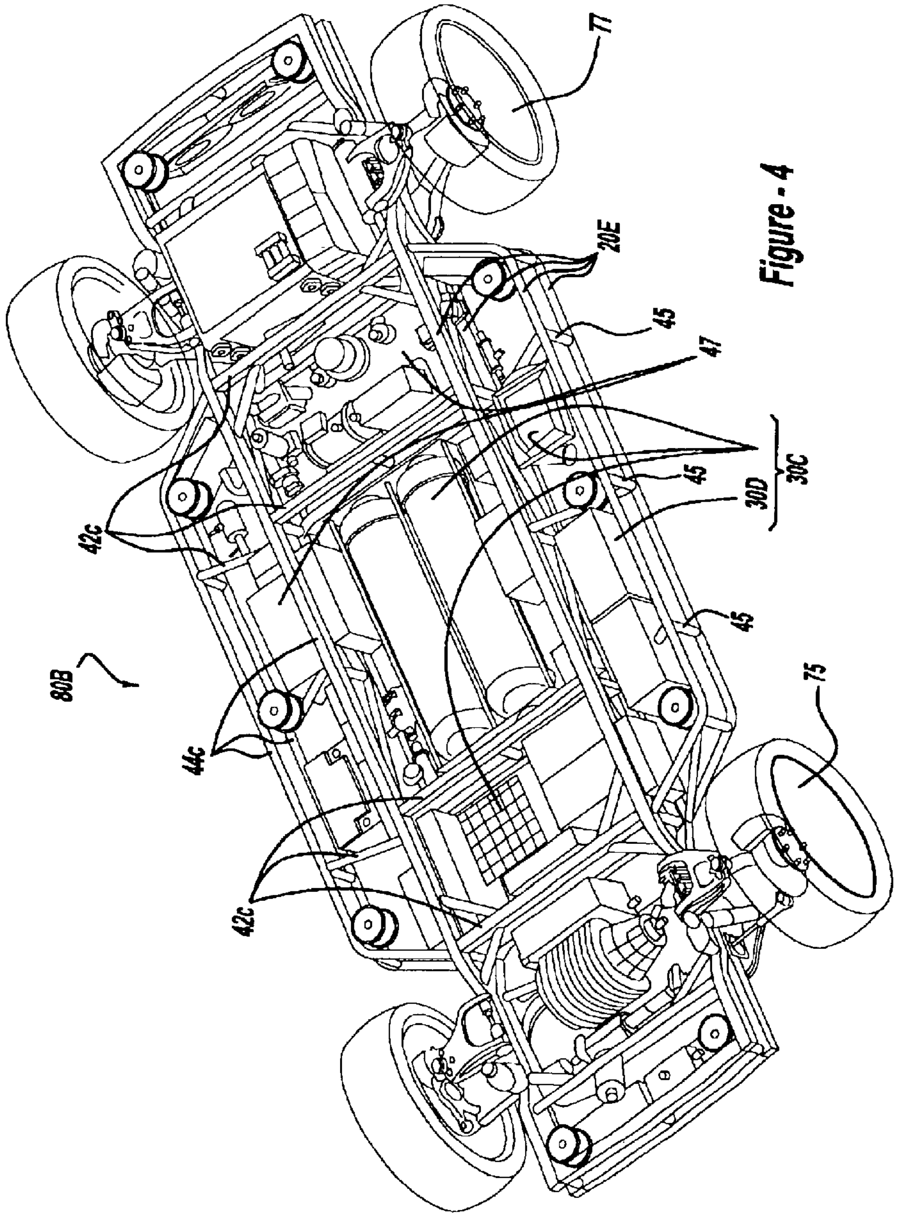
FIG. 4 is a schematic illustration in perspective view of a vehicle chassis frame for use in a method of assembling a vehicle chassis in accordance with the invention.

Referring to FIG. 4, wherein like reference numbers refer to like components in FIG. 1–3, an assembled chassis 80B is depicted. The chassis 80B includes a structural frame 20E having a plurality of transverse structural elements 42C and longitudinal structural elements 44C. Vertical structural elements 45 are also included in the frame 20E. The transverse, longitudinal and vertical structural elements 42C, 44C and 45 define a chassis having a plurality of packaging cavities 47 having openings facing in different directions. Vehicle hardware components 30C are depicted installed in operative positions in the packaging cavities 47. The installation of the vehicle hardware components 30C could be facilitated by mounting substantially all of the vehicle hardware components 30C toward their respective packaging cavities 47 prior to installation. For example, some of the vehicle hardware components 30C, such as vehicle hardware components 30D, may be mounted toward packaging cavities 47 through openings which are configured and framed by vertical structural elements 45 and longitudinal structural elements 44C. The chassis framed by these structural elements has opposed top and bottom faces separated by a circumambient face through which faces hardware may be selectively loaded into the packaging cavities. The framed openings in the circumambient face open sidewardly in a direction between the wheels 75, 77. This direction may be referred to as a side direction, as shown in FIG. 4. Moreover, vehicle hardware components 30C may also be mounted toward packaging cavities configured with openings facing a direction above the wheels while still others may be mounted toward packaging cavities configured with openings facing toward a direction below the wheels. The invention contemplates that the assembly of one chassis may include mounting vehicle hardware components from each of these directions. Thus, mounting may be from a plurality of different directions, such as two substantially opposed directions (i.e., above and below the frame, as depicted in FIG. 1) as well as from a direction substantially normal to the opposed directions (i.e., from a side direction).

Figure 5:
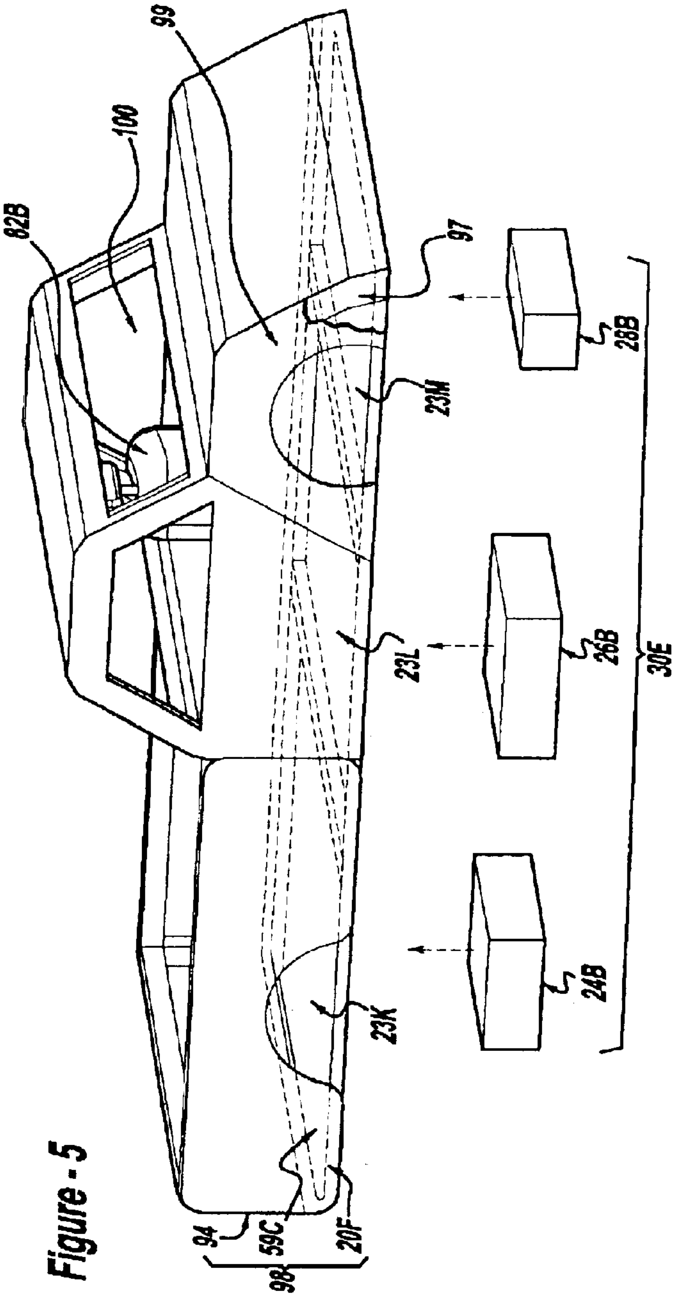
FIG. 5 is a schematic illustration in perspective view of a vehicle chassis frame with a body module operatively connected thereto and vehicle hardware components for use in a method of assembling a vehicle chassis in accordance with the invention.

Referring to FIG. 5, wherein like reference numbers refer to like components in FIGS. 1–4, a second frame assembly 98 is depicted consisting of vehicle body module 94, a frame 20F and a vehicle floor 59C. The vehicle body module 94 includes interior hardware 82B, in the form of a seat, body frame structure 97, and a vehicle body panel 99. Vehicle body 94 is operatively connected to the vehicle frame assembly 98 at the floor 59C to define a passenger compartment 100. The frame 20F defines packaging cavities 23K, 23L and 23M. Vehicle hardware components 30E, including mechanical components 24B, electrical components 26B and interconnecting components 28B, are mounted toward the frame 20F from a direction below the cavities 23K, 23L and 23M. The phantom arrows in FIG. 4 depict mounting the hardware components 30E toward the packaging cavities 23K, 23L and 23M.

Figure 6:
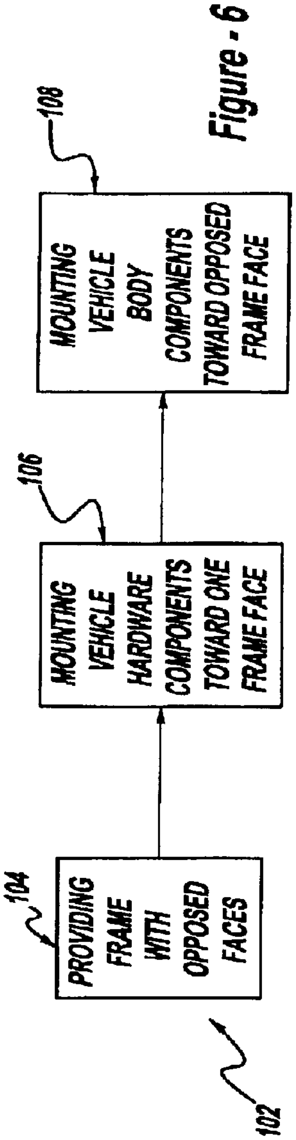
FIG. 6 is a flow diagram illustrating a method of assembling a vehicle chassis in accordance with the invention.

FIG. 6 depicts a method 102 of assembling a vehicle having a body and a chassis. The method includes providing structural elements formed into a frame having opposed faces 104. The method includes mounting vehicle hardware components toward one frame face 106 from one direction to form a chassis. The vehicle hardware components mounted would form at least two of a braking system that is responsive to nonmechanical control signals, a steering system that is responsive to nonmechanical control signals and an energy conversion system that is responsive to nonmechanical control signals. The method further includes mounting vehicle body components toward the opposed frame face 108 from another direction to form a vehicle.

Referring again to FIG. 3, in a preferred embodiment, the vehicle hardware components 30B form a braking system, a steering system and an energy conversion system, each of which is responsive to nonmechanical control signals. In order to enable such systems, the vehicle 96 includes a drive-by-wire connector port 110 that is mounted to the frame 20D and is operably connectable to the steering system component 68, the suspension system component 70, the braking system component 72 and the energy conversion system component 74.

The connector port 110 of the preferred embodiment may perform multiple functions, or select combinations thereof. First, the connector port 110 may function as an electrical power connector, i.e., it may be configured to transfer electrical energy generated by components on the vehicle 96 to a non-frame destination. Second, the connector port 110 may function as a control signal receiver, i.e., a device configured to transfer nonmechanical control signals from a non-frame source to controlled systems including the steering system, the braking system, and the energy conversion system. Third, the connector port 110 may function as a feedback signal conduit through which feedback signals are made available to a vehicle driver. Fourth, the connector port 110 may function as an external programming interface through which software containing algorithms and data may be transmitted for use by controlled systems. Fifth, the connector port 110 may function as an information conduit through which sensor information and other information is made available to a vehicle driver. The connector port 110 may thus function as a communications and power "umbilical" port through which all communications between the vehicle 96 and attachments to the frame are transmitted. The connector port 110 is essentially an electrical connector. Electrical connectors include devices configured to operably connect one or more electrical wires with other electrical wires. The wires may be spaced a distance apart to avoid any one wire causing signal interference in another wire operably connected to an electrical connector or for any reason that wires in close proximity may not be desirable.

Preferably, the steering system component 68 is configured for use in a steering system that is responsive to nonmechanical control signals. In the preferred embodiment, the steering system is by-wire. A by-wire system is characterized by control signal transmission in electrical form. In the context of the present invention, "by-wire" systems, or systems that are controllable "by-wire," include systems configured to receive control signals in electronic form via a control signal receiver, and respond in conformity to the electronic control signals. Redundant mechanical control linkages may also be included with a by-wire steering system.

Figure 7:
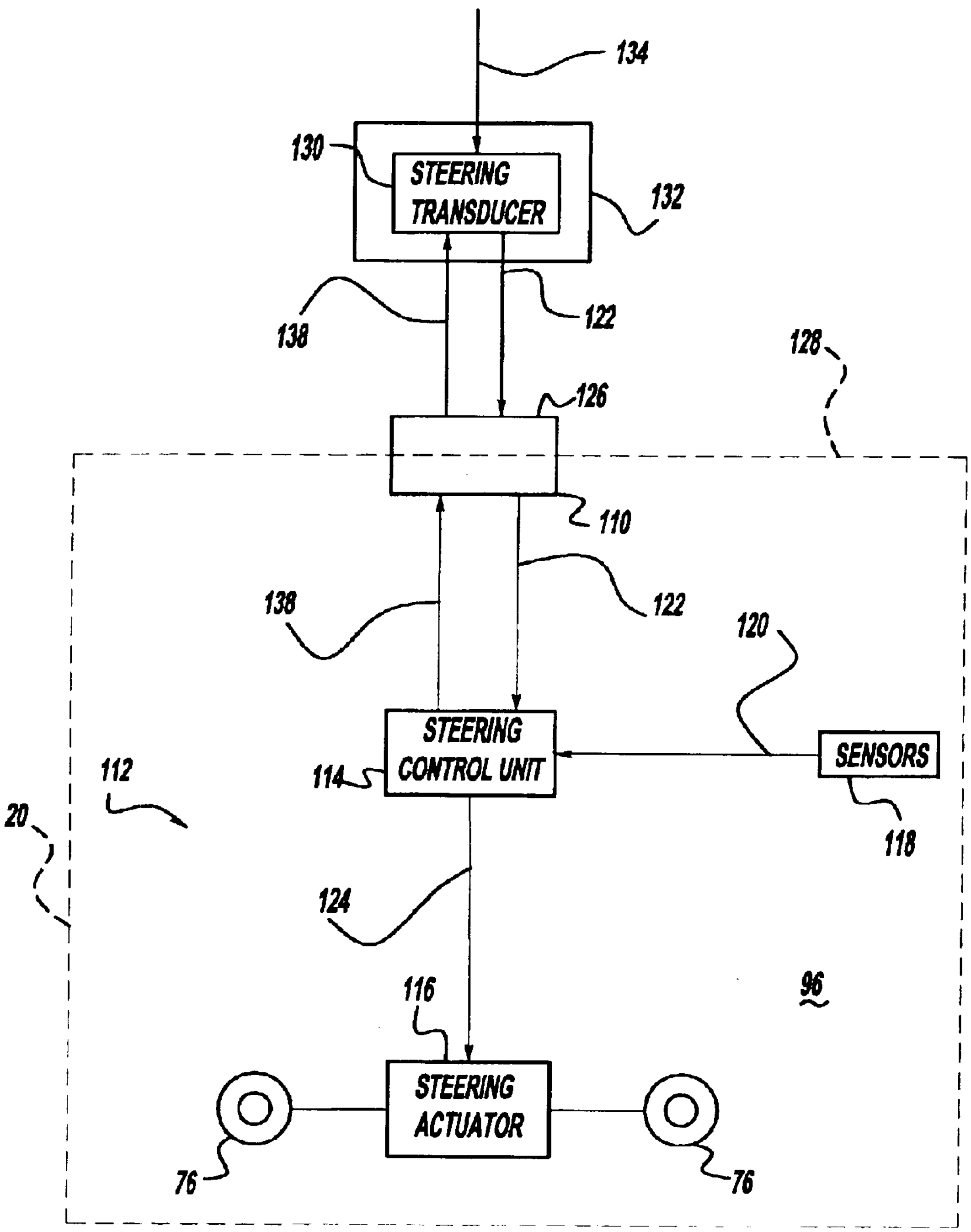
FIG. 7 is a schematic illustration of a steering system for use in a vehicle chassis assembled by a method in accordance with the invention.

Referring to FIG. 7, wherein like reference numbers refer to like components in FIGS. 1–6, a schematic illustration of a steering system for use with the vehicle 96 depicted in FIG. 3 is shown. The by-wire steering system 112 of the preferred embodiment includes a steering control unit 114, and a steering actuator 116. Sensors 118 are located on the vehicle 96 and transmit sensor signals 120 carrying information concerning the state or condition of the vehicle 96 and its component systems. The sensors 118 may include position sensors, velocity sensors, acceleration sensors, pressure sensors, force and torque sensors, flow meters, temperature sensors, etc. The steering control unit 114 receives and processes sensor signals 120 from the sensors 118 and electrical steering control signals 122 from the connector port 110, and generates steering actuator control signals 124 according to a stored algorithm. A control unit typically includes a microprocessor, ROM and RAM and appropriate input and output circuits of a known type for receiving the various input signals and for outputting the various control commands to the actuators. Sensor signals 120 may include yaw rate, lateral acceleration, angular wheel velocity, tie-rod force, steering angle, chassis velocity, etc.

The steering actuator 116 is operably connected to front wheels 76 and configured to adjust the steering angle of the front wheels 76 in response to the steering actuator control signals 124. Actuators in a by-wire system transform electronic control signals into a mechanical action or otherwise influence a system's behavior in response to the electronic control signals. Examples of actuators that may be used in a by-wire system include electromechanical actuators such as electric servomotors, translational and rotational solenoids, magnetorheological actuators, electrohydraulic actuators, and electrorheological actuators. Those skilled in the art will recognize and understand mechanisms by which the steering angle is adjusted. In the preferred embodiment, the steering actuator 116 is an electric drive motor configured to adjust a mechanical steering rack.

Referring to FIG. 7, the preferred embodiment of the vehicle 96 is configured such that it is steerable by any source of compatible electrical steering control signals 122 connected to the connector port 110. The connector port 110 interfits with a complementary connector 126 at the connector interface 128. FIG. 7 depicts a steering transducer 130 located within an operator interface 132 and connected to the complementary connector 126. Transducers convert the mechanical control signals of a vehicle driver to non-mechanical control signals. When used with a by-wire system, transducers convert the mechanical control signals to electrical control signals usable by the by-wire system. A vehicle driver inputs control signals in mechanical form by turning a wheel, gripping or turning a handle or handles, using head or eye movements, using controlled breathing movements (puffs or sucks of air), pressing a button, or the like. Transducers utilize sensors, typically position and force sensors, to convert the mechanical input to an electrical signal.

The complementary connector 126 is coupled with the connector port 110 of the connector interface 128. The steering transducer 130 converts vehicle driver-initiated mechanical steering control signals 134 to electrical steering control signals 136 which are transmitted via the connector port 110 to the steering control unit 114. In the preferred embodiment, the steering control unit 114 generates steering feedback signals 138 for use by a vehicle driver and transmits the steering feedback signals 138 through the connector port 110. Some of the sensors 118 monitor linear distance movement of a steering rack and vehicle speed. This information is processed by the steering control unit 114 according to a stored algorithm to generate the steering feedback signals 138.

Figure 8:
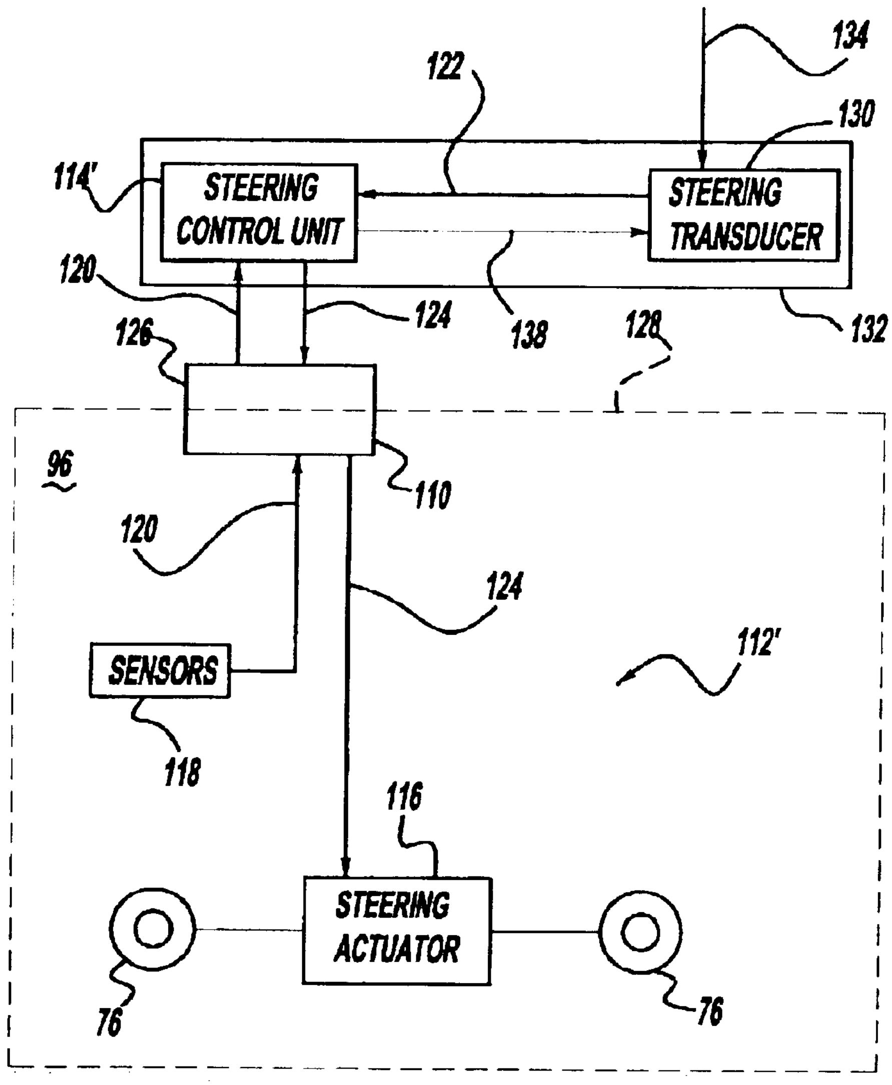
FIG. 8 is a schematic illustration of an alternative steering system for use in a vehicle chassis assembled by a method in accordance with the invention.

In the context of the present invention, a "by-wire" system may be an actuator connected directly to the connector port 110. An alternative by-wire steering system 112' within the scope of the claimed invention is depicted schematically in FIG. 8, wherein like reference numbers refer to like components from FIG. 1–7. A steering actuator 116 configured to adjust the steering angle of the front wheels 76 is connected directly to the connector port 110. In this embodiment, a steering control unit 114' and a steering transducer 130 may be located in the operator interface 132. The steering transducer 130 would transmit electrical steering control signals 122 to the steering control unit 114', and the steering control unit 114' would transmit steering actuator control signals 124 to the steering actuator 116 via the connector port 110. Sensors 118 positioned on the vehicle 96 transmit sensor signals 120 to the steering control unit 114' via the connector port 110 and the complementary connector 126.

Examples of steer-by-wire systems are described in U.S. Pat. No. 6,176,341, issued Jan. 23, 2001 to Delphi Technologies, Inc; U.S. Pat. No. 6,208,923, issued Mar. 27, 2001 to Robert Bosch GmbH; U.S. Pat. No. 6,219,604, issued Apr. 17, 2001 to Robert Bosch GmbH; U.S. Pat. No. 6,318,494, issued Nov. 20, 2001 to Delphi Technologies, Inc.; U.S. Pat. No. 6,370,460, issued Apr. 9, 2002 to Delphi Technologies, Inc.; and U.S. Pat. No. 6,394,218, issued May 28, 2002 to TRW Fahrwerksysteme GmbH & Co. KG; which are hereby incorporated by reference in their entireties.

The steer-by-wire system described in U.S. Pat. No. 6,176,341 includes a position sensor for sensing angular position of a road wheel, a hand-operated steering wheel for controlling direction of the road wheel, a steering wheel sensor for sensing position of the steering wheel, a steering wheel actuator for actuating the hand-operated steering wheel, and a steering control unit for receiving the sensed steering wheel position and the sensed road wheel position and calculating actuator control signals, preferably including a road wheel actuator control signal and a steering wheel actuator control signal, as a function of the difference between the sensed road wheel position and the steering wheel position. The steering control unit commands the road wheel actuator to provide controlled steering of the road wheel in response to the road wheel actuator control signal. The steering control unit further commands the steering wheel actuator to provide feedback force actuation to the hand-operated steering wheel in response to the steering wheel control signal. The road wheel actuator control signal and steering wheel actuator control signal are preferably scaled to compensate for difference in gear ratio between the steering wheel and the road wheel. In addition, the road wheel actuator control signal and steering wheel actuator control signal may each have a gain set so that the road wheel control actuator signal commands greater force actuation to the road wheel than the feedback force applied to the steering wheel.

The steer-by-wire system described in U.S. Pat. No. 6,176,341 preferably implements two position control loops, one for the road wheel and one for the hand wheel. The position feedback from the steering wheel becomes a position command input for the road wheel control loop and the position feedback from the road wheel becomes a position command input for the steering wheel control loop. A road wheel error signal is calculated as the difference between the road wheel command input (steering wheel position feedback) and the road wheel position. Actuation of the road wheel is commanded in response to the road wheel error signal to provide controlled steering of the road wheel. A steering wheel error signal is calculated as the difference between the steering wheel position command (road wheel position feedback) and the steering wheel position. The hand-operated steering wheel is actuated in response to the steering wheel error signal to provide force feedback to the hand-operated steering wheel.

The steering control unit of the '341 system could be configured as a single processor or multiple processors and may include a general-purpose microprocessor-based controller, that may include a commercially available off-the-shelf controller. One example of a controller is Model No. 87C196CA microcontroller manufactured and made available from Intel Corporation of Delaware. The steering control unit preferably includes a processor and memory for storing and processing software algorithms, has a clock speed of 16 MHz, two optical encoder interfaces to read position feedbacks from each of the actuator motors, a pulse width modulation output for each motor driver, and a 5-volt regulator.

U.S. Pat. No. 6,370,460 describes a steer-by-wire control system comprising a road wheel unit and a steering wheel unit that operate together to provide steering control for the vehicle operator. A steering control unit may be employed to support performing the desired signal processing. Signals from sensors in the road wheel unit, steering wheel unit, and vehicle speed are used to calculate road wheel actuator control signals to control the direction of the vehicle and steering wheel torque commands to provide tactile feedback to the vehicle operator. An Ackerman correction may be employed to adjust the left and right road wheel angles correcting for errors in the steering geometry to ensure that the wheels will track about a common turn center.

Figure 9:
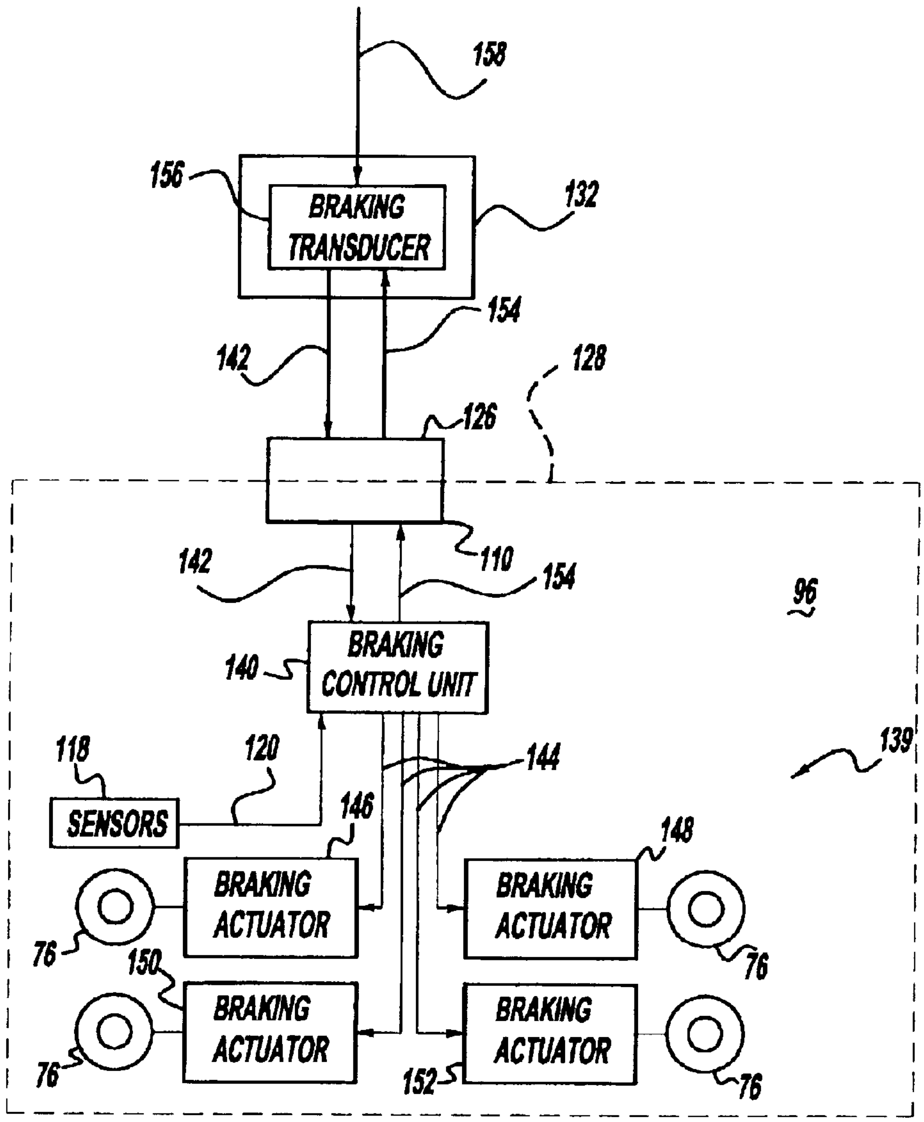
FIG. 9 is a schematic illustration of a braking system for use in a vehicle chassis assembled by a method in accordance with the invention.

Referring again to FIG. 3, a braking system component 72 is mounted to the frame 20F. The braking system component 72 is configured for use in a braking system that is responsive to nonmechanical control signals. In the preferred embodiment, the braking system is by-wire, as depicted schematically in FIG. 9, by braking system 139, wherein like reference numbers refer to like components from FIGS. 1–8. Sensors 118 transmit sensor signals 120 carrying information concerning the state or condition of the vehicle 96 and its component systems to a braking control unit 140. The braking control unit 140 is connected to the connector port 110 and is configured to receive electrical braking control signals 142 via the connector port 110. The braking control unit 140 processes the sensor signals 120 and the electrical braking control signals 142 and generates braking actuator control signals 144 according to a stored algorithm. The braking control unit 140 then transmits the braking actuator control signals 144 to braking actuators 146, 148, 150, 152 which act to reduce the angular velocity of the wheels 76. Those skilled in the art will recognize the manner in which the braking actuators 146, 148, 150, 152 act on the wheels 76. Typically, actuators cause contact between friction elements, such as pads and disc rotors. Optionally, an electric motor may function as a braking actuator in a regenerative braking system.

The braking control unit 140 may also generate braking feedback signals 154 for use by a vehicle driver and transmit the braking feedback signals 154 through the connector port 110. In the preferred embodiment, the braking actuators 146, 148, 150, 152 apply force through a caliper to a rotor at each wheel. Some of the sensors 118 measure the applied force on each caliper. The braking control unit 140 uses this information to ensure synchronous force application to each rotor.

Referring again to FIG. 9, the preferred embodiment of the vehicle 96 is configured such that the braking system 139 is responsive to any source of compatible electrical braking control signals 142. A braking transducer 156 may be located in the operator interface 132 and connected to a complementary connector 126 interfitted with the connector port 110 at the connector interface 128. The braking transducer 156 converts vehicle driver-initiated mechanical braking control signals 158 into electrical form and transmits the electrical braking control signals 142 to the braking control unit via the connector port 110. The braking transducer 156 includes sensors that measure both the rate of applied pressure and the amount of applied pressure, thereby converting mechanical braking control signals 158 to electrical braking control signals 142. The braking control unit 140 processes both the rate and amount of applied pressure to provide both normal and panic stopping.

Figure 10:
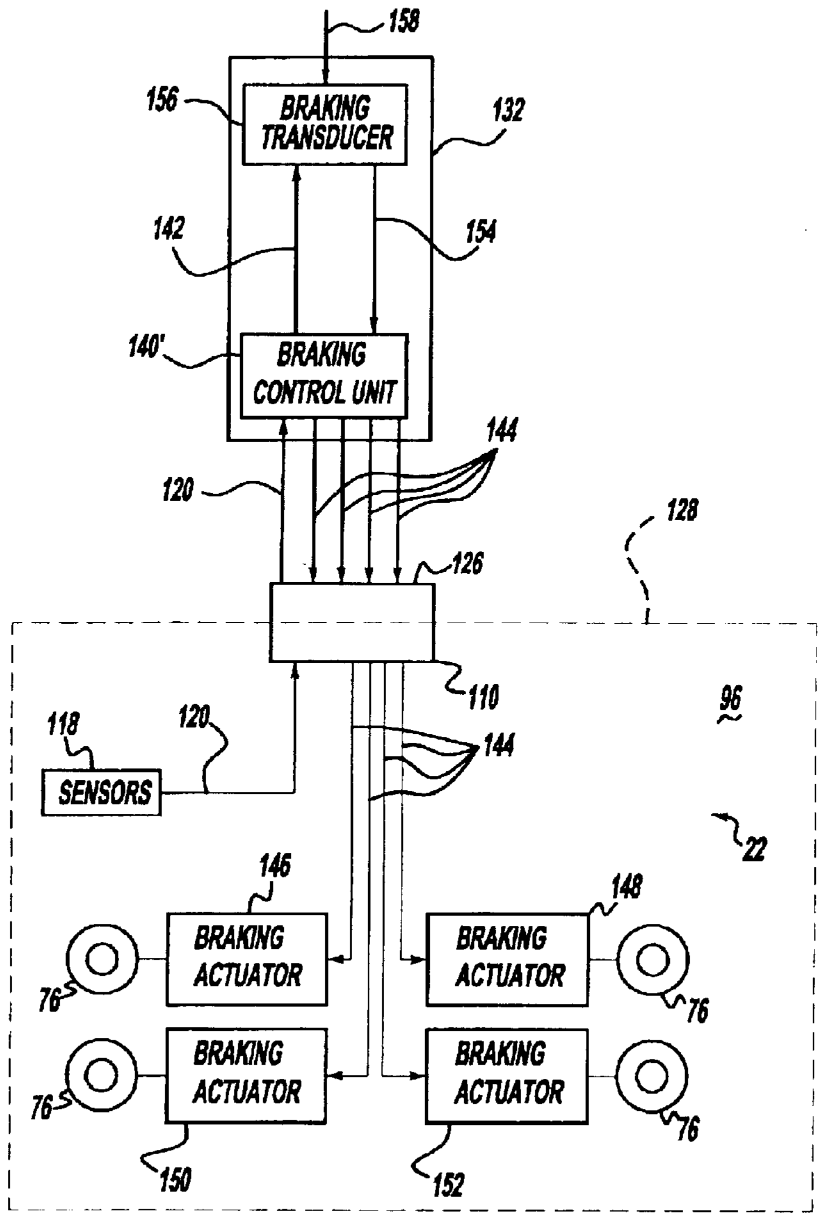
FIG. 10 is a schematic illustration of an alternative braking system for use in a vehicle chassis assembled by a method in accordance with the invention.

An alternative brake-by-wire system 139' within the scope of the claimed invention is depicted in FIG. 10, wherein like reference numbers refer to like components from FIGS. 1–9. The braking actuators 146, 148, 150, 152 and sensors 118 are connected directly to the connector port 110. In this embodiment, a braking control unit 140' may be located within the operator interface 132. A braking transducer 156 within the operator interface 132 transmits electrical braking control signals 142 to the braking control unit 140', and the braking control unit 140' transmits braking actuator signals 144 to the braking actuators 146, 148, 150, 152 via the connector 126 and to the connector port 110.

Examples of brake-by-wire systems are described in U.S. Pat. No. 5,366,281, issued Nov. 22, 1994 to General Motors Corporation; U.S. Pat. No. 5,823,636, issued Oct. 20, 1998 to General Motors Corporation; U.S. Pat. No. 6,305,758, issued Oct. 23, 2001 to Delphi Technologies, Inc.; and U.S. Pat. No. 6,390,565, issued May 21, 2002 to Delphi Technologies, Inc.; which are hereby incorporated by reference in their entireties.

The system described in U.S. Pat. No. 5,366,281 includes an input device for receiving mechanical braking control signals, a brake actuator and a control unit coupled to the input device and the brake actuator. The control unit receives brake commands, or electrical braking control signals, from the input device and provides actuator commands, or braking actuator control signals, to control current and voltage to the brake actuator. When a brake command is first received from the input device, the control unit outputs, for a first predetermined time period, a brake torque command to the brake actuator commanding maximum current to the actuator. After the first predetermined time period, the control unit outputs, for a second predetermined time period, a brake torque command to the brake actuator commanding voltage to the actuator responsive to the brake command and a first gain factor. After the second predetermined time period, the control unit outputs the brake torque command to the brake actuator commanding current to the actuator responsive to the brake command and a second gain factor, wherein the first gain factor is greater than the second gain factor and wherein brake initialization is responsive to the brake input.

U.S. Pat. No. 6,390,565 describes a brake-by-wire system that provides the capability of both travel and force sensors in a braking transducer connected to a brake apply input member such as a brake pedal and also provides redundancy in sensors by providing the signal from a sensor responsive to travel or position of the brake apply input member to a first control unit and the signal from a sensor responsive to force applied to a brake apply input member to a second control unit. The first and second control units are connected by a bi-directional communication link whereby each controller may communicate its received one of the sensor signals to the other control unit. In at least one of the control units, linearized versions of the signals are combined for the generation of first and second brake apply command signals for communication to braking actuators. If either control unit does not receive one of the sensor signals from the other, it nevertheless generates its braking actuator control signal on the basis of the sensor signal provided directly to it. In a preferred embodiment of the system, a control unit combines the linearized signals by choosing the largest in magnitude.

Figure 11:
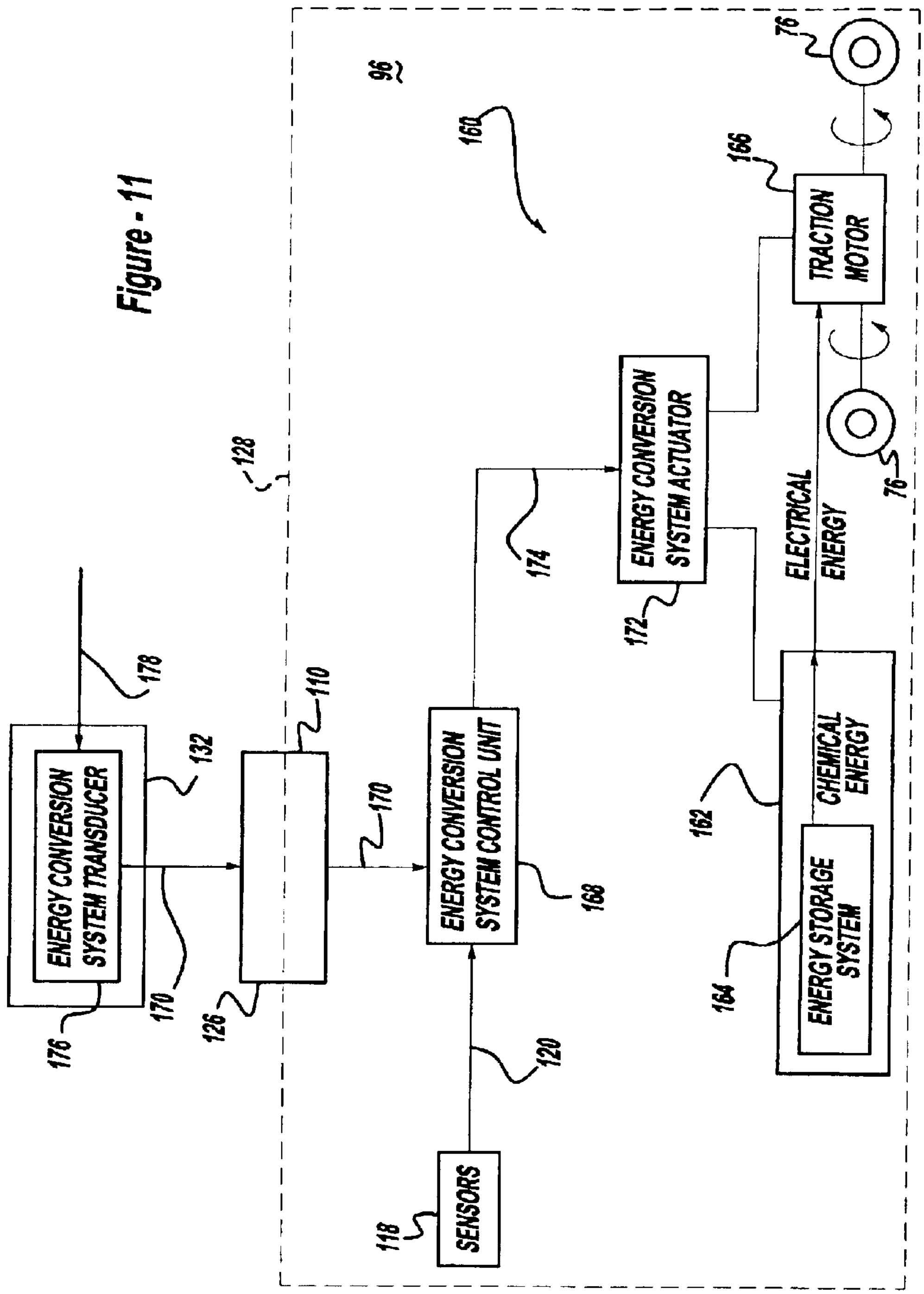
FIG. 11 is a schematic illustration of an energy conversion system for use in a vehicle chassis assembled by a method in accordance with the invention.

Referring to FIG. 11, wherein like reference numbers refer to like components in FIGS. 1–10, a schematic illustration of an energy conversion system 160 for use with the vehicle 96 depicted in FIG. 3 is shown. The energy conversion system 160 includes an energy converter 162 that converts the energy stored in an energy storage system 164 to mechanical energy that propels the vehicle 96. In the preferred embodiment, depicted in FIG. 11, the energy converter 162 is operably connected to a traction motor 166. The energy converter 162 converts chemical energy into electrical energy, and the traction motor 166 converts the electrical energy to mechanical energy, and applies the mechanical energy to rotate the front wheels 76. Those skilled in the art will recognize many types of energy converters 162 that may be employed within the scope of the present invention.

The energy conversion system 160 is configured to respond to nonmechanical control signals. The energy conversion system 160 of the preferred embodiment is controllable by-wire, as depicted in FIG. 11. An energy conversion system control unit 168 is connected to the connector port 110 from which it receives electrical energy conversion system control signals 170, and sensors 118 from which it receives sensor signals 120 carrying information about various vehicle conditions. In the preferred embodiment, the information conveyed by the sensor signals 120 to the energy conversion system control unit 168 includes vehicle velocity, electrical current applied, rate of acceleration of the vehicle, and motor shaft speed to ensure smooth launches and controlled acceleration. The energy conversion system control unit 168 is connected to an energy conversion system actuator 172, and transmits energy conversion system actuator control signals 174 to the energy conversion system actuator 172 in response to the electrical energy conversion system control signals 170 and sensor signals 120 according to a stored algorithm. The energy conversion system actuator 172 acts on the energy conversion system 160 or traction motor 166 to adjust energy output. Those skilled in the art will recognize the various methods by which the energy conversion system actuator 172 may adjust the energy output of the energy conversion system.

An energy conversion system transducer 176 may be located in the operator interface 132 and connected to a complementary connector 126 engaged with the connector port 110 at the connector interface 128. The energy conversion system transducer 176 is configured to convert mechanical energy conversion system control signals 178 to electrical energy conversion system control signals 170.

Figure 12:
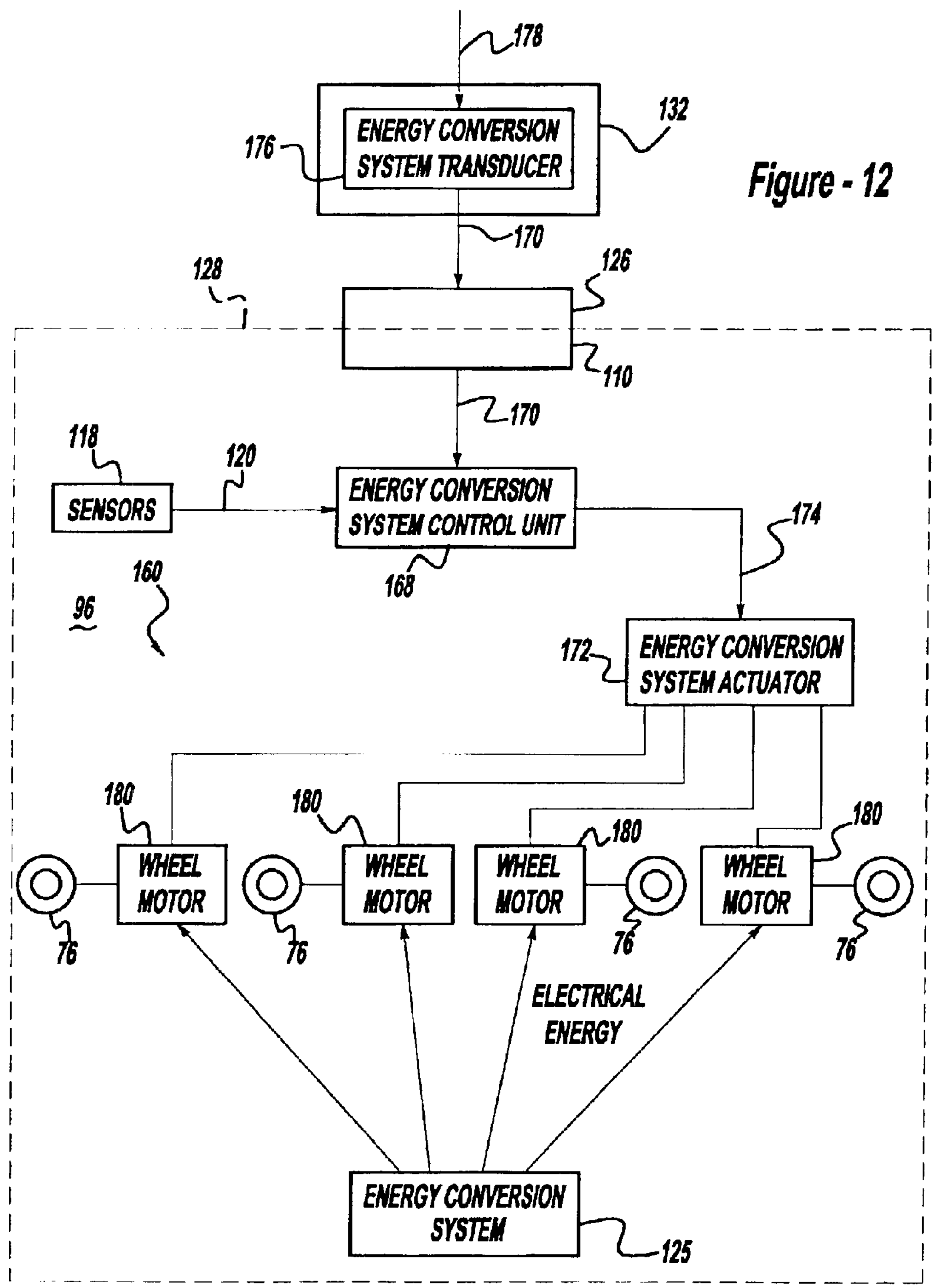
FIG. 12 is a schematic illustration of an alternative energy conversion system for use in a vehicle chassis assembled by a method in accordance with the invention.

In another embodiment of the invention, as shown schematically in FIG. 12, wherein like reference numbers refer to like components from FIGS. 1–11, wheel motors 180, also known as wheel hub motors, are positioned at each of the four wheels 76. Optionally, wheel motors 180 may be provided at only the front wheels 76 or only the rear wheels. The use of wheel motors 180 reduces the height of the vehicle 96 compared to the use of traction motors, and therefore may be desirable for certain uses.

Figure 13:
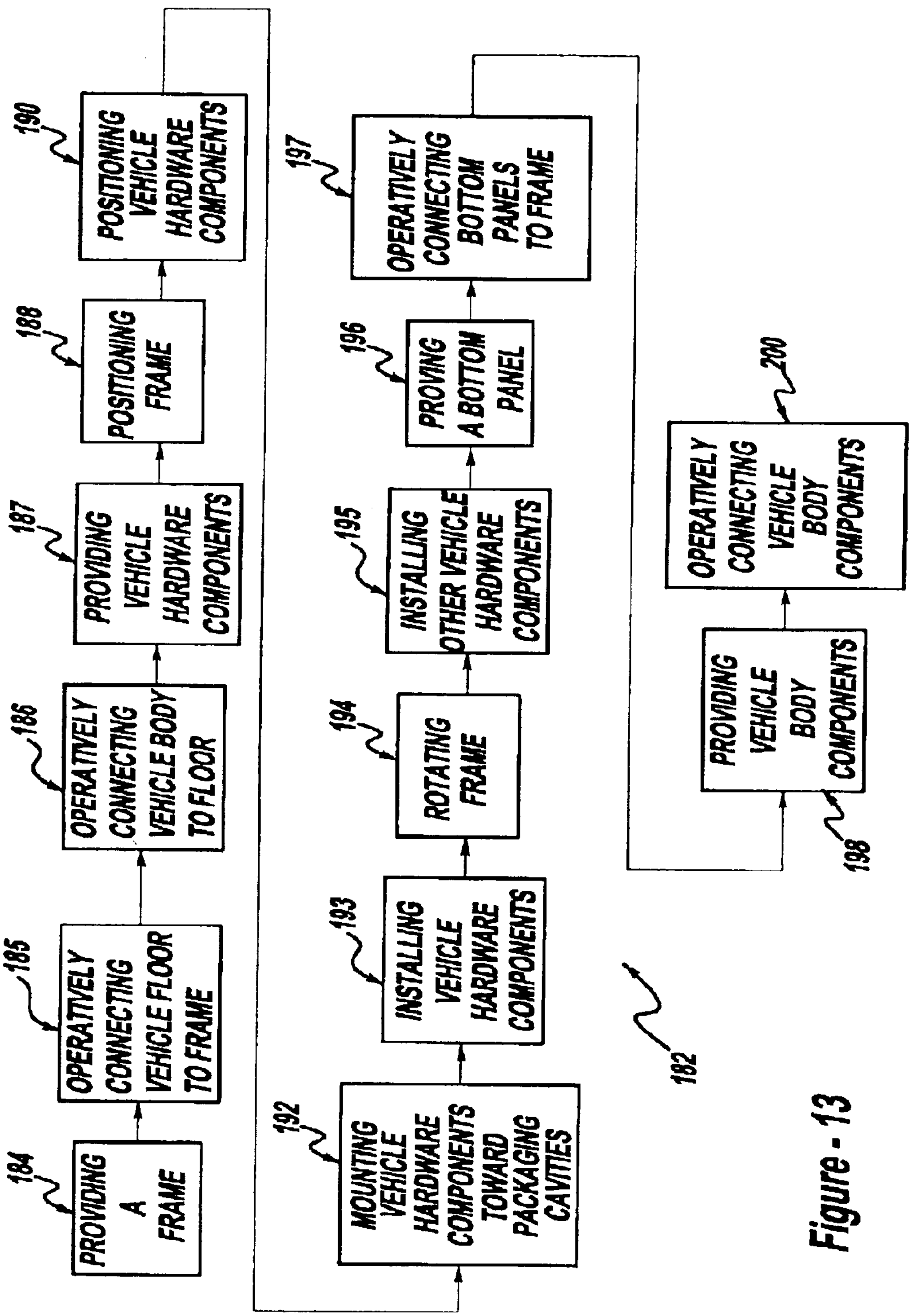
FIG. 13 is a flow diagram of a method of assembling a vehicle chassis in accordance with the invention.

FIG. 13 depicts a method 182 of assembling the vehicle 96 shown in FIG. 3. The method includes providing a vehicle chassis structural frame defining a plurality of packaging cavities having openings facing in different directions 184. The frame may have opposed faces separated by a circumambient face, and the different directions may include at least two substantially opposed directions and another direction substantially normal to the opposed direction, as discussed with respect to the frame depicted in FIG. 4. In one aspect of the invention, the method 182 may further include operatively connecting a vehicle floor to the frame to form a frame assembly having the vehicle floor overlaying at least some of the packaging cavities opening in at least one of the different directions 185. The method 182 may further include operatively connecting a vehicle body to the frame assembly at the vehicle floor to at least partially define a passenger compartment 186.

FIG. 13 depicts, and the method 182 further includes, providing vehicle hardware components 187. The invention contemplates that the vehicle hardware components provided may include at least one of braking system components, steering system components, and energy conversion system components. The energy conversion system component may be a fuel cell. In one embodiment, the vehicle hardware components form at least two of a braking system that is responsive to nonmechanical control signals, a steering system that is responsive to nonmechanical control signals and an energy conversion system that is responsive to nonmechanical control signals. In another embodiment, the vehicle hardware components form a braking system, a steering system and an energy conversion system, each of which is responsive to nonmechanical control signals. The vehicle hardware components provided may be provided as a hardware module. The hardware module is preassembled before being operatively connected to the frame.

The method 182 may further include positioning the frame relative to the vehicle hardware components 188 prior to mounting the vehicle hardware components toward respective openings in the respective packaging cavities. Positioning the frame relative to vehicle hardware components 188 may also be referred to as positioning the frame in a first position. Positioning the frame 188 may be accomplished by automated means. The automated means may include a conveyor system or an hydraulic lift.

Figure 14A:
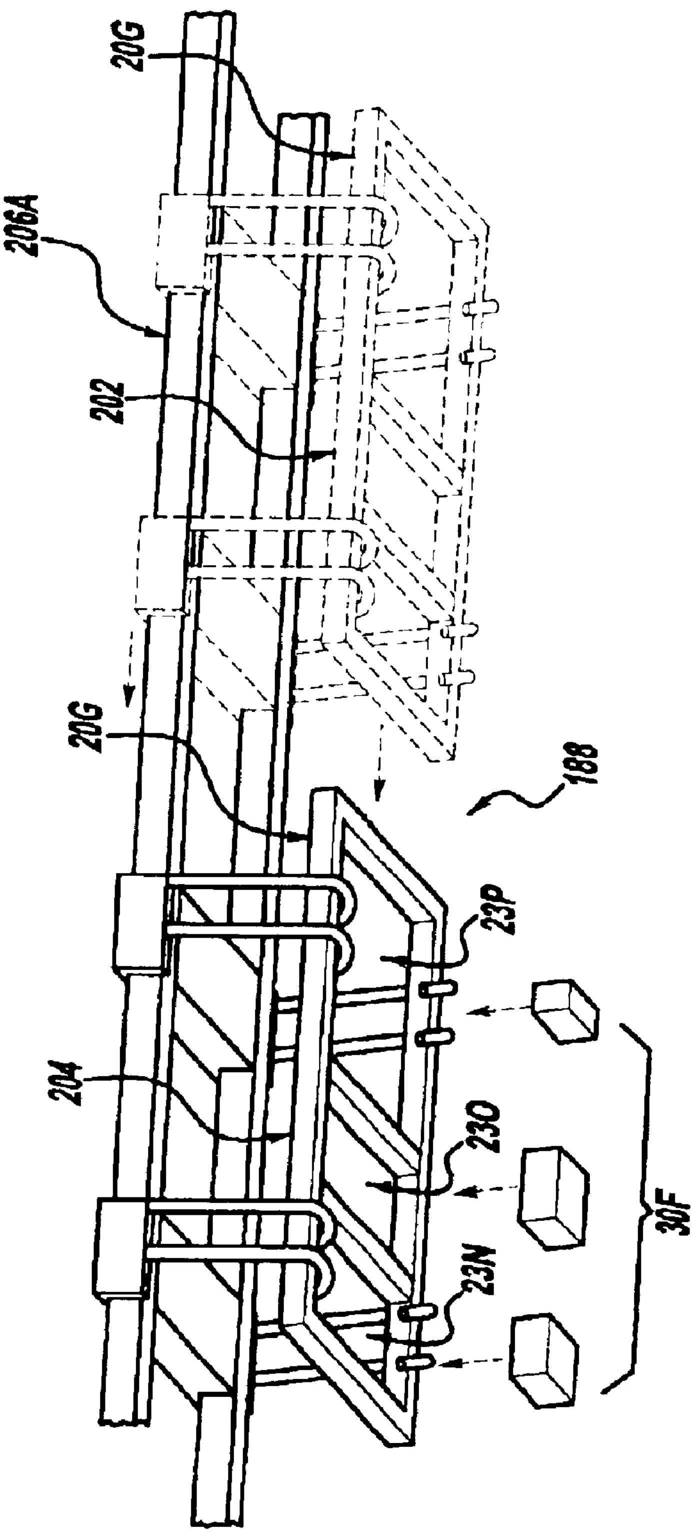
FIGS. 14A and 14B are schematic illustrations in perspective view of positioning a vehicle frame in accordance with the invention.
Figure 14B:
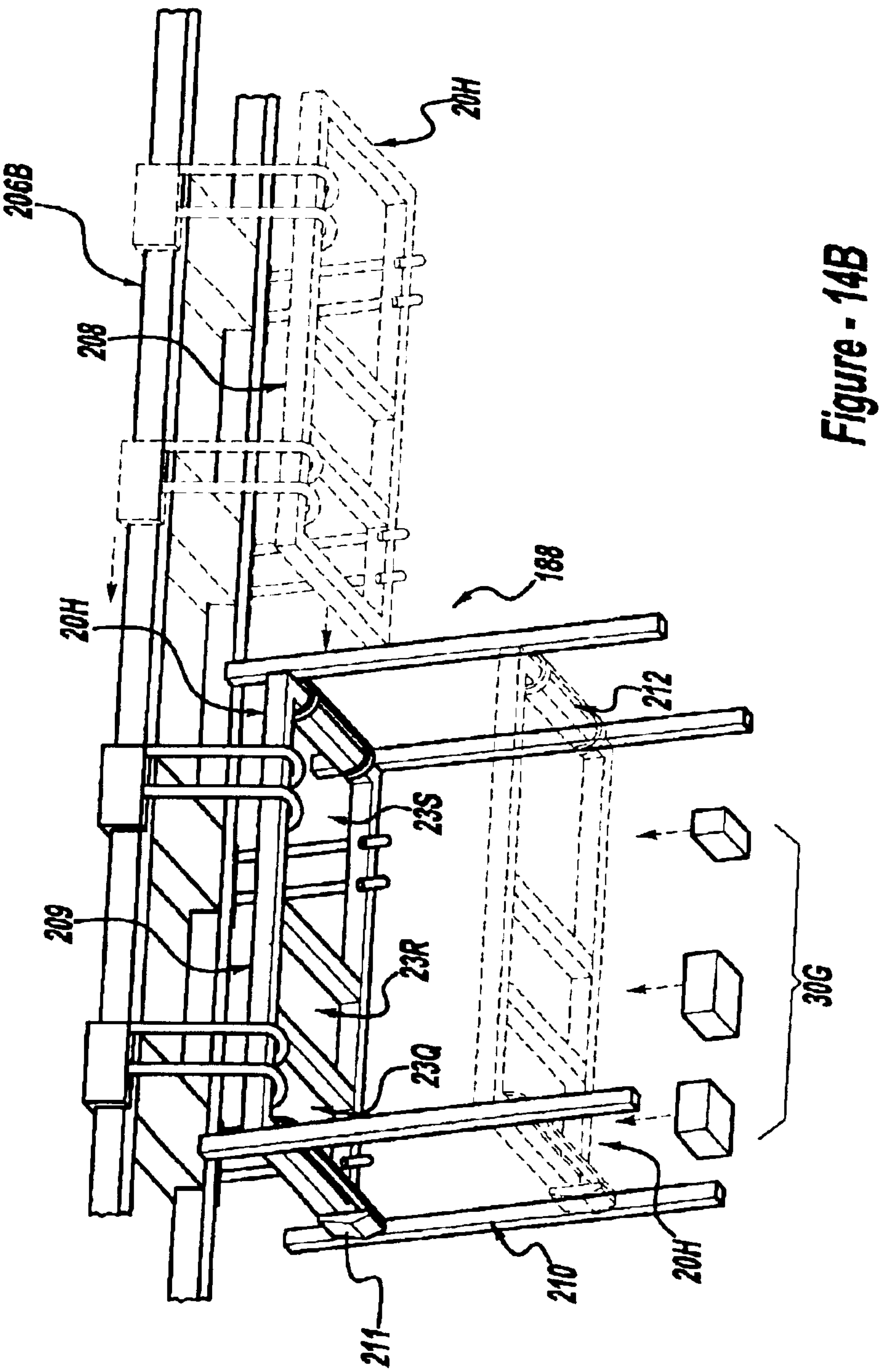

Positioning the frame 188 is depicted in FIGS. 14A and 14B. In FIG. 14A, a frame 20G is shown with phantom lines in a first position 202 on a conveyor system 206A. A phantom arrow depicts positioning the frame 20G to a second position 204 above vehicle hardware components 30F. The frame 20G is formed with packaging cavities 23N, 23O, 23P. Phantom arrows depicted above the vehicle hardware components 30F depict mounting the vehicle hardware components 30F toward the packaging cavities 23N, 23O, 23P.

In FIG. 14B, a frame 20H is held in a first position 208 by a conveyor system 206B. The frame has packaging cavities 23Q, 23R and 23S. The phantom arrow shows positioning the frame 20H in a second position 209 above vehicle hardware components 30G, by movement of the conveyor system 206B. The second position 209 is at an hydraulic lift 210 having a motor 211 capable of lowering the frame 20H to a third position 212 prior to mounting the vehicle hardware components 30G toward respective openings in the respective packaging cavities 23Q, 23R and 23S.

Figure 15:
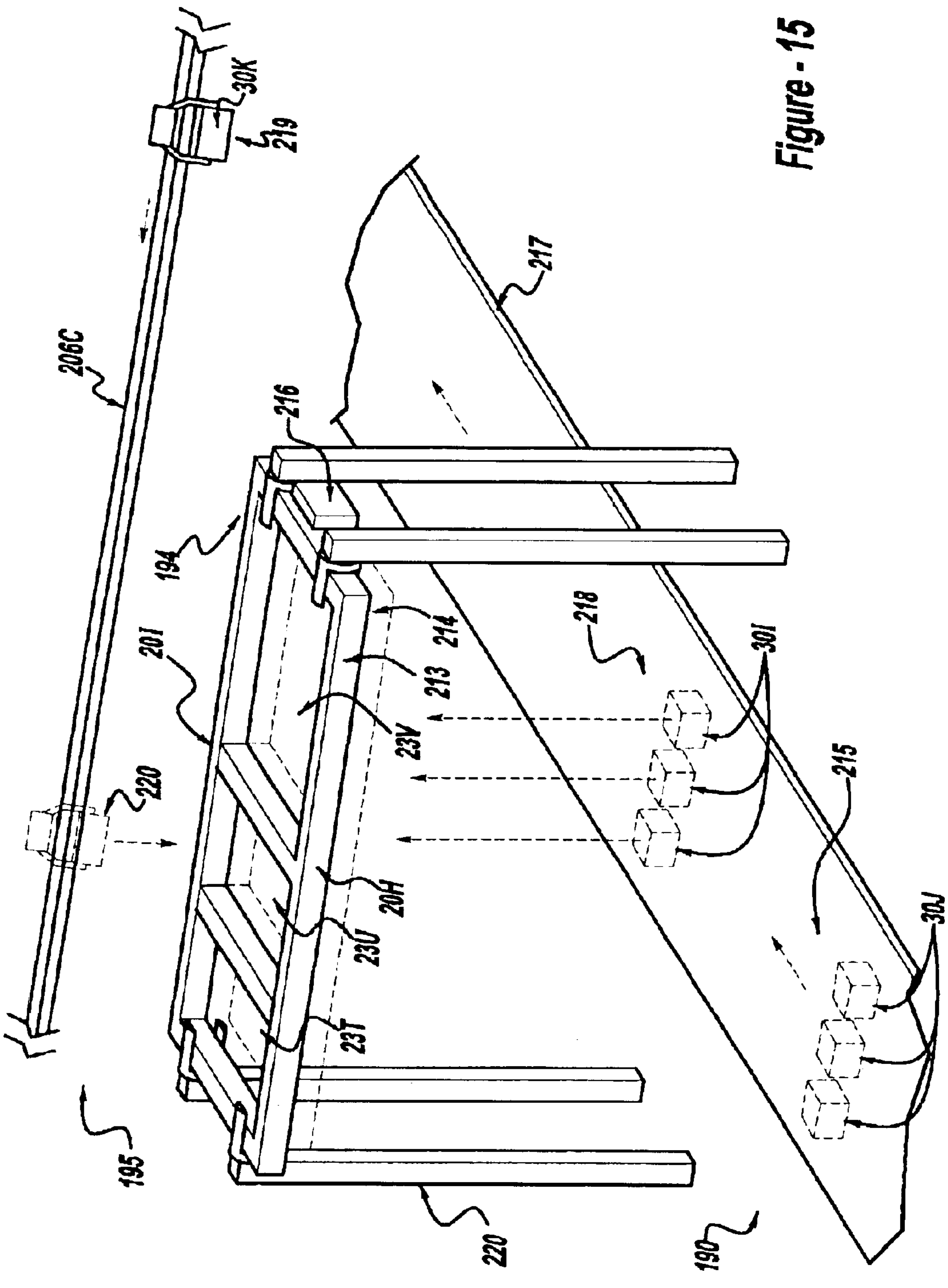
FIG. 15 is a schematic illustration in perspective view of positioning vehicle hardware components in accordance with the invention.

Referring again to FIG. 13, the method 182 may further include installing vehicle hardware components into operative position in their packaging cavities when the frame is positioned in a first position 193. The method 182 may further include rotating the frame to a second position 194 and installing at least another of the vehicle hardware components into operative position in its packaging cavity when the frame is in the second position 195. Rotating the frame 194 and installing another vehicle hardware component 195 are depicted in FIG. 15, in which a frame 20I is held in a first position 213 on supporting structure 220. Vehicle hardware components 30I are mounted toward respective openings in respective packaging cavities 23T, 23U and 23V formed in the frame 20I. Phantom arrows indicate rotation of the frame 20I to a second position 214 shown in phantom. Rotation of the frame may be accomplished by a motor 216 mounted on the supporting structure and operably connected to the frame 20I. In FIG. 15 the second position is rotated 180 degrees from the first position. The invention also contemplates any other degree of rotation between first and second positions.

The method 182 further includes installing other vehicle hardware components into operative positions in packaging cavities when the frame is rotated in the second position 195. FIG. 15 depicts other vehicle hardware components 30J which may move on a conveyor belt 217 from a first hardware component position 215 to a second hardware component position 218 with respect to the frame 20I in the second position 214 prior to installing the other vehicle hardware components 30J into operative positions in the packaging cavities 23T, 23U and 23V. Movement of the other vehicle hardware components 30J from a first position 215 to a second position 218 with respect to the frame 20I illustrates another aspect of the method 182, positioning the vehicle hardware components relative to the frame 190 prior to mounting the vehicle hardware components toward respective openings in the respective packaging cavities. Positioning the vehicle hardware components 190 may be accomplished by automated means within the scope of the invention. The automated means may include a conveyor system, as depicted in FIG. 15 by the conveyor belt 216, or an hydraulic lift.

The invention contemplates that the other vehicle hardware components 30J may also be installed into operative position with respect to packaging cavities 23T, 23U and 23V from a different direction when the frame 20I is rotated in the second position 214, including a direction above the frame 20I and its supporting structure 220. Accordingly, FIG. 15 also shows a different hardware component 30K moved from a first position 219 to a second position 220 above the frame 20I rotated to its second position 214 on a conveyor system 206C prior to installing the different hardware component 30K into operative position in packaging cavity 23U. As depicted in FIG. 15, the different hardware component 30K is installed toward the same opening in the packaging cavity 23U as vehicle hardware components 30I. Thus, the invention includes installing some vehicle hardware components into operative position in packaging cavities from a direction below the packaging cavities, rotating the frame 180 degrees and installing other vehicle hardware components into operative position in the packaging cavities from a direction above the packaging cavities.

Figure 16:
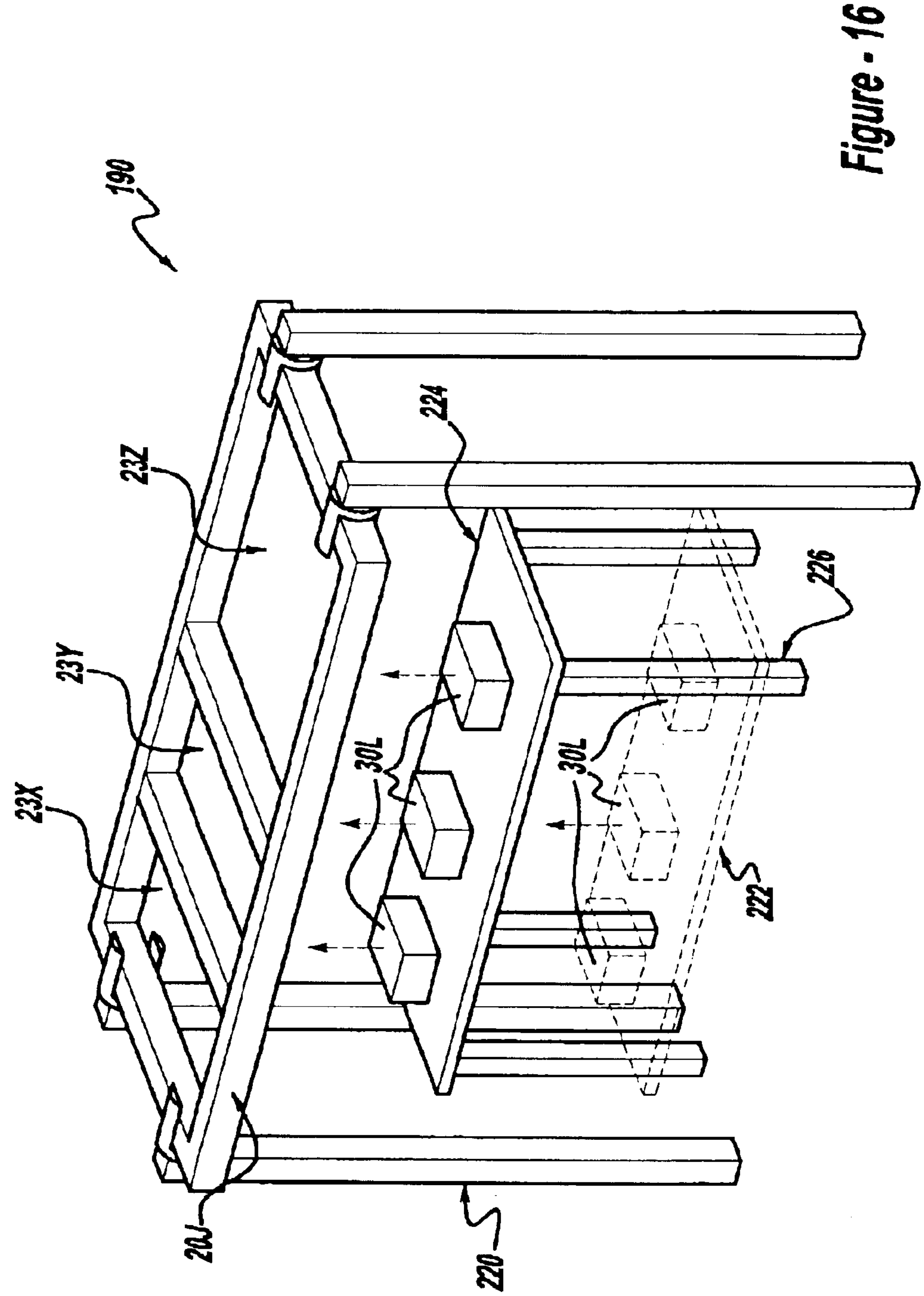
FIG. 16 is a schematic illustration in perspective view of another arrangement of positioning vehicle hardware components in accordance with the invention.

Referring to FIG. 16, wherein like reference numbers refer to like components in FIGS. 1–15, positioning the vehicle hardware components relative to the frame 190 in a position below the frame is further depicted by use of an hydraulic lift. Vehicle hardware components 30L are shown in phantom in a first position 222 held by a mechanical lift 226. Positioning the vehicle hardware components is shown by the phantom upward arrow indicating that the vehicle hardware components 30L are moved to a second position 224 below the frame 20J. The frame 20J has packaging cavities 23X, 23Y and 23Z. The frame 20J is held stationary by frame supporting structure 220.

Referring again to FIG. 13, the method 182 may include mounting the vehicle hardware components toward respective openings in their respective packaging cavities from respective directions 192. In one embodiment, at least two of the different directions are opposed. This is depicted in FIG. 1 wherein a second vehicle hardware component 25 is mounted toward packaging cavity 23A from a direction above the frame 20A and electrical component 26 is mounted toward packaging cavity 23B from an opposite direction below the frame 20A. If the frame provided has opposed faces separated by a circumambient face, as depicted in FIG. 4 and discussed with respect thereto, then mounting may be through one of these faces.

The method 182 may further include installing at least some of the vehicle hardware components into operative positions in their packaging cavities 193. In a preferred embodiment, the installation of at least some of the vehicle hardware components and their respective packaging cavities are arranged to make those components removable from the frame in respective ones of the different directions. Installing vehicle hardware components into operative positions in their packaging cavities is depicted in FIG. 1, by mechanical component 38 operatively connected to the frame 20A, and in FIG. 4, which depicts a plurality of vehicle hardware components 30C installed in operative positions in packaging cavities 47.

Referring again to FIG. 13, the method 182 further includes providing at least one bottom panel 196. The method 182 includes operatively connecting the bottom panel to the frame provided from one of the different directions to at least partially close at least some of the packaging spaces 197.

The method 182 further includes providing vehicle body components 198. The vehicle body components include interior hardware, vehicle body frame structure and at least one vehicle body panel, as depicted in FIG. 3. At least some of the vehicle body components may be provided as a body module within the scope of the invention, as depicted in FIG. 5. The body module is preassembled before being operatively connected to the frame assembly provided.

Referring again to FIG. 15, the method 182 further includes operatively connecting the vehicle body components to the frame assembly at the vehicle floor 200. This is depicted in FIG. 3, in which phantom lines show movement of vehicle body components 92 toward the vehicle floor 59B for operative connection thereto.

Figure 17:
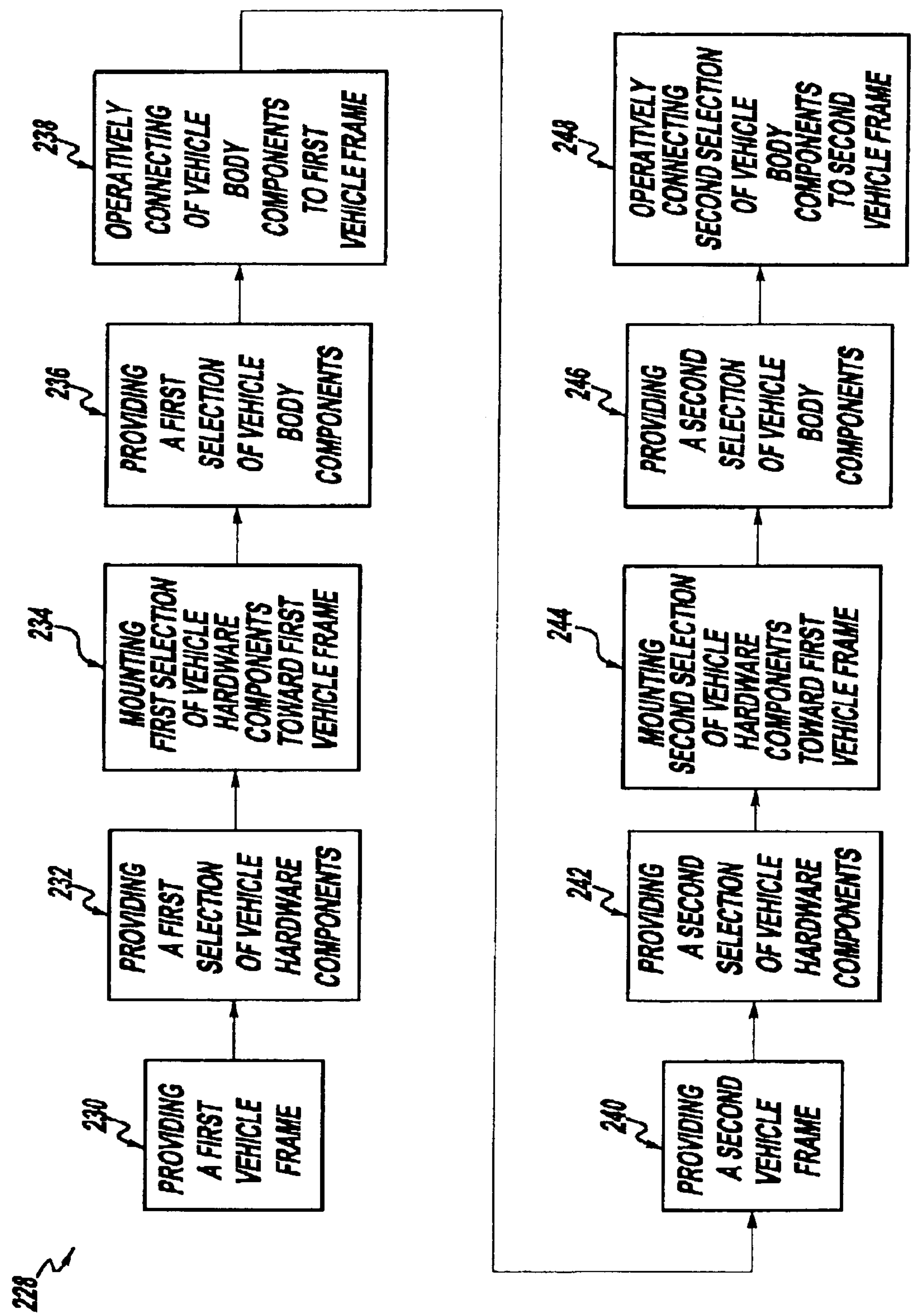
FIG. 17 is a flow diagram of a method of assembling vehicle chassis in accordance with the invention.

The invention includes a method of assembling vehicles 228 depicted in FIG. 17. The method 228 includes providing a first vehicle frame 230 having opposed faces. The method 228 further includes providing a first selection of vehicle hardware components 232, wherein the vehicle hardware components form at least two of a braking system that is responsive to nonmechanical control signals, a steering system that is responsive to nonmechanical control signals and an energy conversion system that is responsive to nonmechanical control signals. The method 228 further includes mounting the first selection of vehicle hardware components toward one face of the first frame one direction 234. The method 228 further includes providing a first selection of vehicle body components including interior hardware, vehicle body frame structure and at least one vehicle body panel 236. The method 228 includes operatively connecting the first selection of vehicle body components to the opposed face of the first frame from another direction to form a vehicle 238.

The method 228 further includes providing a second vehicle frame 240 wherein the second vehicle frame is substantially identical to the first vehicle frame. The method 228 further includes providing a second selection of vehicle hardware components 242, wherein the vehicle hardware components form at least two of a braking system that is responsive to nonmechanical control signals, a steering system that is responsive to nonmechanical control signals and an energy conversion system that is responsive to nonmechanical control signals. The method 228 further includes mounting the second selection of vehicle hardware components toward the one face of the second frame 244 from the same direction from which the first selection of vehicle hardware components was mounted toward the first vehicle frame. Under the method 228, the configuration of at least one of the components in the first set of vehicle hardware components is sufficiently different than the configuration of at least one of the components in the second selection of vehicle hardware components such that the first selection is different than the second selection. The invention contemplates that the configurations of the components may differ in that the configuration of at least one of the components of the first selection may perform a different function than the configuration of at least one of the components of the second selection. For example, the first selection may include braking system components that provide for an anti-lock braking function while the second selection of braking components perform standard friction braking without an anti-lock feature. Additionally, the invention contemplates that the configuration of the first selection may define a different vehicle type than the configuration of the second selection of vehicle hardware components. For example, the first selection of vehicle hardware components may define a chassis with braking, steering, and energy conversion systems that operate with mechanical control linkages whereas the second selection may define a chassis wherein such systems are by-wire.

The method 228 further includes providing a second selection of vehicle body components 246 including interior hardware, vehicle body frame structure and at least one vehicle body panel. The method 228 further includes operatively connecting the second selection of vehicle body components to the opposed face of the second frame 248 from the same direction from which the first selection of vehicle body components was operatively connected to the first frame, to form a second vehicle Under method 228, the configuration of at least one component of the first selection of vehicle body components is sufficiently different than the configuration of at least one of the components in the second selection of vehicle body components such that the first vehicle is configured differently than the second vehicle. The invention contemplates that the difference in configuration may be such that the first selection defines a different body style than the second selection. For example, the first selection may be for a compact passenger vehicle while the second selection may be for a pickup truck. Additionally, the invention contemplates that the first selection of vehicle body components may differ from the second selection in that a component of the same type included in both the first and second selections is of a different material in the first selection than in the second selection. For example, the first selection may include a steel door panel while the second selection includes a fiberglass door panel.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the scope of the invention within the scope of the appended claims.

What is claimed is:

1. A method of assembling a vehicle chassis, the method comprising:

providing a vehicle chassis structural frame defining a plurality of packaging cavities having openings facing in different directions;

providing vehicle hardware components;

mounting at least some of respective ones of the vehicle hardware components toward respective openings in the respective packaging cavities from respective ones of the different directions; and installing said at least some of the respective ones of the vehicle hardware components into operative positions in their respective packaging cavities; wherein the installation of at least some of the vehicle hardware components and their respective packaging cavities are arranged to make those components removable from the frame in respective ones of the different directions.

2. The method of claim 1, wherein the vehicle hardware components include braking system components, steering system components and energy conversion system components.

3. The method of claim 2, wherein substantially all of the vehicle hardware components are mounted toward their respective openings in their respective packaging cavities.

4. The method of claim 2, wherein the energy conversion system components include a fuel cell.

5. The method of claim 1, wherein at least two of the different directions are opposed.

6. The method of claim 1, further comprising operatively connecting a vehicle floor to the frame to form a frame assembly having the vehicle floor overlaying at least some of the packaging cavities opening in at least one of the different directions.

7. The method of claim 6, further comprising operatively connecting a vehicle body to the frame assembly at the vehicle floor to at least partially define a passenger compartment.

8. The method of claim 6, further comprising:

providing vehicle body components including interior hardware, vehicle body frame structure and at least one vehicle body panel; and operatively connecting the vehicle body components to the frame assembly at said vehicle floor.

9. The method of claim 8, wherein at least some of the vehicle body components are provided as a body module, the body module being preassembled before said operatively connecting.

10. The method of claim 1, wherein at least some of the vehicle hardware components are provided as a hardware module, the hardware module being preassembled before said mounting.

11. The method of claim 1, further comprising:

providing at least one bottom panel and operatively connecting said at least one bottom panel to said frame from one of the different directions to at least partially close at least some of the packaging cavities.

12. The method of claim 1, including positioning said frame relative to the vehicle hardware components prior to mounting the vehicle hardware components toward respective openings in the respective packaging cavities.

13. The method of claim 12, wherein positioning the frame is accomplished by automated means.

14. The method of claim 13, wherein the automated means include a conveyor system.

15. The method of claim 13, wherein the automated means include an hydraulic lift.

16. The method of claim 1, including positioning the vehicle hardware components relative to said frame prior to mounting the vehicle hardware components toward respective openings in the respective packaging cavities.

17. The method of claim 16, wherein positioning the vehicle hardware components is accomplished by automated means.

18. The method of claim 17, wherein the automated means include a conveyor system.

19. The method of claim 17, wherein the automated means include an hydraulic lift.

20. A method of assembling a vehicle chassis, the method comprising:

providing a vehicle chassis structural frame defining a plurality of packaging cavities having openings facing in different directions;

providing vehicle hardware components; and mounting at least some of respective ones of the vehicle hardware components toward respective openings in the respective packaging cavities from respective ones of the different directions; wherein the different directions include at least two substantially opposed directions and another direction substantially normal to the opposed directions.

21. A method of assembling a vehicle chassis, the method comprising:

providing a vehicle chassis structural frame defining a plurality of packaging cavities having openings facing in different directions;

providing vehicle hardware components; and mounting at least some of respective ones of the vehicle hardware components toward respective openings in the respective packaging cavities from respective ones of the different directions; wherein the frame has opposed faces separated by a circumambient face and wherein the vehicle hardware components are selectively mounted toward a respective cavity through a selected one of any of the faces.

22. A method of assembling a vehicle chassis, the method comprising:

providing a vehicle chassis structural frame defining a plurality of packaging cavities having openings facing in different directions;

providing vehicle hardware components; and mounting at least some of respective ones of the vehicle hardware components toward respective openings in the respective packaging cavities from respective ones of the different directions; wherein the vehicle hardware components include braking system components, steering system components and energy conversion system components; and wherein the vehicle hardware components form at least two of a braking system that is responsive to nonmechanical control signals, a steering system that is responsive to nonmechanical control signals and an energy conversion system that is responsive to nonmechanical control signals.

23. A method of assembling a vehicle chassis, the method comprising:

providing a vehicle chassis structural frame defining a plurality of packaging cavities having openings facing in different directions;

providing vehicle hardware components; and mounting at least some of respective once of the vehicle hardware components toward respective openings in the respective packaging cavities from respective ones of the different directions; wherein the vehicle hardware components include braking system components, steering system components and energy conversion system components; and wherein the vehicle hardware components form a braking system, a steering system and an energy conversion system, wherein each of said systems is responsive to nonmechanical control signals.

24. A method of assembling a vehicle chassis, the method comprising:

providing a vehicle chassis structural frame defining a plurality of packaging cavities having openings facing in different directions;

providing vehicle hardware components;

mounting at least some of respective ones of the vehicle hardware components toward respective openings in the respective packaging cavities from respective ones of the different directions;

positioning said frame in a first position;

installing at least one of said vehicle hardware components into operative position in its respective packaging cavity when said frame is in said first position;

rotating said frame to a second position; and installing at least another of said vehicle hardware components into operative position in its respective packaging cavity when said frame is in its second position.

25. A method of assembling a vehicle having a body and a chassis comprising:

providing structural elements formed into a frame having opposed frame faces;

mounting vehicle hardware components toward at least one of the frame faces from one direction to form a chassis, wherein the vehicle hardware components form at least two of a braking system that is responsive to nonmechanical control signals, a steering system that is responsive to nonmechanical control signals and an energy conversion system that is responsive to nonmechanical control signals; and mounting vehicle body components toward the opposed frame face from another direction to form a vehicle.

26. The method of claim 25, wherein providing structural elements includes forming the opposed face of the frame as a floor for the body.

27. The method of claim 25, wherein mounting hardware components and mounting body components is done at substantially the same time.

28. A method of assembling vehicle chassis, the method comprising:

providing a first vehicle chassis frame having opposed faces, providing a first selection of vehicle hardware components, wherein the vehicle hardware components form at least two of a braking system that is responsive to nonmechanical control signals, a steering system that is responsive to nonmechanical control signals and an energy conversion system that is responsive to nonmechanical control signals, and mounting the first selection of vehicle hardware components toward one face of the first frame from one direction; and providing a second vehicle frame, wherein the second vehicle frame is substantially identical to the first vehicle frame, providing a second selection of vehicle hardware components, wherein the vehicle hardware components from at least two of a braking system that is responsive to nonmechanical control signals, a steering system that is responsive to nonmechanical control signals and an energy conversion system that is responsive to nonmechanical control signals, and mounting the second selection of vehicle hardware components toward one face of the second frame from said one direction;

wherein the configuration of at least one of the components of the first selection of vehicle hardware components is sufficiently different than the configuration of at least one of the components in the second selection of vehicle hardware components such that the first selection is different than the second selection.

29. The method of claim 28, wherein the configuration of said at least one of the components of the first selection performs a different function than the configuration of said at least one components of the second selection.

30. The method of claim 28, wherein the configuration of said at least one of the components of the first selection defines a different vehicle type than the configuration of said at least one of the components of the second selection.

31. The method of claim 28, further comprising:

providing a first selection of vehicle body components including interior hardware, vehicle body frame structure and at least one vehicle body panel, operatively connecting the first selection of vehicle body components to the opposed face of the first vehicle frame from another direction to form a vehicle;

providing a second selection of vehicle body components including interior hardware, vehicle body frame structure and at least one vehicle body panel, and operatively connecting the second selection of vehicle body components to the opposed face of the second frame from said another direction to form a second vehicle;

wherein the configuration of at least one of the components of the first selection of vehicle body components is sufficiently different than the configuration of at least one of the components in the second selection of vehicle body components such that the first vehicle is configured differently than the second vehicle.

32. The method of claim 31, wherein the configuration of said at least one of the vehicle body components of the first selection defines a different body style than the configuration of said at least one of the vehicle body components of the second selection.

33. The method of claim 31, wherein said at least one of the vehicle body components of the first selection is the same type of component but of a different material than said at least one of the vehicle body components of the second selection.

34. A method of assembling a vehicle chassis, the method comprising:

providing a vehicle chassis structural frame defining a plurality of packaging cavities having openings facing in different directions including at least two substantially opposed directions and another direction substantially normal to the opposed directions, wherein the frame has opposed faces separated by a circumambient face;

providing vehicle hardware components including braking system components, steering system components and energy conversion system components, wherein the vehicle hardware components form a braking system, a steering system and an energy conversion system, wherein each of said systems is responsive to nonmechanical control signals;

mounting at least some of the respective ones of the vehicle hardware components toward respective openings in the respective packaging cavities from respective ones of the different directions through a selected one of any of the faces; and installing said at least some of the respective ones of the vehicle hardware components into operative positions in their respective packaging cavities, wherein the installation of at least some of the vehicle hardware components and their respective packaging cavities are arranged to make those components removable from the frame in respective ones of the different directions.

* * * * *